United States Patent
Kim et al.

(10) Patent No.: US 10,482,151 B2
(45) Date of Patent: Nov. 19, 2019

(54) METHOD FOR PROVIDING ALTERNATIVE SERVICE AND ELECTRONIC DEVICE THEREOF

(71) Applicant: Samsung Electronics Co., Ltd., Gyeonggi-do (KR)

(72) Inventors: Hyun-Jae Kim, Gyeonggi-do (KR); Myung-Su Kang, Seoul (KR); Jeong-Yong Kim, Gyeonggi-do (KR); Jung-Won Kim, Seoul (KR); Sang-Bae Shin, Gyeonggi-do (KR)

(73) Assignee: Samsung Electronics Co., Ltd., Yeongtong-gu, Suwon-si, Gyeonggi-do (KR)

( * ) Notice: Subject to any disclaimer, the term of this patent is extended or adjusted under 35 U.S.C. 154(b) by 68 days.

(21) Appl. No.: 14/828,654

(22) Filed: Aug. 18, 2015

(65) Prior Publication Data
US 2016/0048498 A1  Feb. 18, 2016

(30) Foreign Application Priority Data
Aug. 18, 2014  (KR) .......................... 10-2014-0107196

(51) Int. Cl.
*G06F 17/27*  (2006.01)
*G06F 16/957*  (2019.01)

(52) U.S. Cl.
CPC ................................ *G06F 16/9577* (2019.01)

(58) Field of Classification Search
CPC ....................................................... G06F 17/27
See application file for complete search history.

(56) References Cited

U.S. PATENT DOCUMENTS

| | | | |
|---|---|---|---|
| 6,233,010 B1* | 5/2001 | Roberts | H04N 1/00236 348/240.99 |
| 9,985,943 B1* | 5/2018 | Reading et al. | G06F 21/31 |
| 2002/0152283 A1* | 10/2002 | Dutta | G06F 17/30896 709/218 |
| 2010/0095350 A1* | 4/2010 | Lazar | G06F 21/36 726/3 |
| 2011/0065428 A1* | 3/2011 | Schroeter | H04M 3/00 |
| 2011/0296509 A1* | 12/2011 | Todorov | H04L 9/32 |
| 2012/0159586 A1* | 6/2012 | Carney et al. | G06F 21/00 |
| 2012/0192277 A1* | 7/2012 | Jakobsson | G06F 21/31 726/24 |
| 2012/0254971 A1* | 10/2012 | Hu et al. | G06F 21/20 |

(Continued)

FOREIGN PATENT DOCUMENTS

| | | |
|---|---|---|
| JP | 2009-70079 A | 4/2009 |
| KR | 2002-0058386 A | 7/2002 |

(Continued)

*Primary Examiner* — James J Debrow
(74) *Attorney, Agent, or Firm* — Cha & Reiter, LLC.

(57) ABSTRACT

An electronic device and method are disclosed. The method is operable on the electronic device to parse attribute information of an electronic document displayed on a display unit of the electronic device, and when a component of the electronic document is activated, detect a format of the activated component based on the parsed attribute information, and when the detected format indicates visual media, output an alternative notification comprising at least one a notification in a different format than the detected format.

20 Claims, 17 Drawing Sheets

(56) References Cited

U.S. PATENT DOCUMENTS

2013/0019286 A1\* 1/2013 Barborak .............. G06F 17/27
                                                        726/4
2014/0196133 A1\* 7/2014 Shuster ................ H04L 63/126
                                                        726/7

FOREIGN PATENT DOCUMENTS

KR      2003-0087031 A    11/2003
KR      10-1337501 B1     12/2013

\* cited by examiner

METHOD FOR PROVIDING ALTERNATIVE SERVICE AND ELECTRONIC DEVICE THEREOF

CLAIM OF PRIORITY

This application claims the benefit under 35 U.S.C. § 119(a) of a Korean patent application filed on Aug. 18, 2014 in the Korean Intellectual Property Office and assigned Serial No. 10-2014-0107196, the entire disclosure of which is hereby incorporated by reference.

TECHNICAL FIELD

The present disclosure relates to a method of providing an alternative service and an electronic device thereof.

BACKGROUND

According to the development of information communication technologies and semiconductor technologies, various electronic devices have been developed as multimedia devices that provide various multimedia services. For example, electronic devices provide various multimedia services such as a messenger service, a broadcasting service, a wireless Internet service, a camera service, and a music reproduction service. The electronic device may provide various Internet services through webpages, and a user may select an item between webpages to perform a search.

Blind people sequentially move items between webpages by using a navigation key or a gesture, and use Internet by a method of identifying contents of the moved items through a Text To Speech (TTS) function.

Because blind people cannot view a screen when performing a webpage search, the blind people should identify the screen through a TTS function while sequentially moving items existing on a webpage. Such a use method has many restrictions in a webpage search function due to its characteristic and makes problems such as an increase in information acquisition time and a decrease in the use. Further, as webpages that do not follow the accessibility standard increase, blind people cannot search for the corresponding webpages, thereby deteriorating Internet accessibility.

SUMMARY

Accordingly, an aspect of the present disclosure is to provide a method and an electronic device which may provide an alternative service based on attribute information of an electronic document.

Another aspect of the present disclosure is to provide a method and an electronic device which may perform a function related to text extracted by parsing an image displayed on an electronic document.

Another aspect of the present disclosure is to provide a method and an electronic device which may improve security and usability when blind people interact with an electronic document.

Another aspect of the present disclosure is to provide a method and an electronic device which may provide an intuitive user interface by detecting a configuration of an electronic document.

In accordance with an aspect of the present disclosure, a method in electronic device, comprising: parsing attribute information of an electronic document, and when a component of the electronic document is activated, detecting a format of the activated component based on the parsed attribute information, and when the detected format indicates visual media, outputting an alternative notification comprising at least one a notification in a different format than the detected format. In accordance with another aspect of the present disclosure, an electronic device is provided. The electronic device includes a display unit, a processor configured to parse attribute information of an electronic document displayed on the display unit, and when a component of the electronic document is activated, detect a format of the activated component based on the parsed attribute information, and when the detected format indicates visual media, output an alternative notification comprising at least one a notification in a different format than the detected format.

BRIEF DESCRIPTION OF THE DRAWINGS

The above and other aspects, features, and advantages of certain embodiments of the present disclosure will be more apparent from the following description taken in conjunction with the accompanying drawings, in which.

The same reference numerals are used to represent the same elements throughout the drawings.

DETAILED DESCRIPTION

Figure 1:
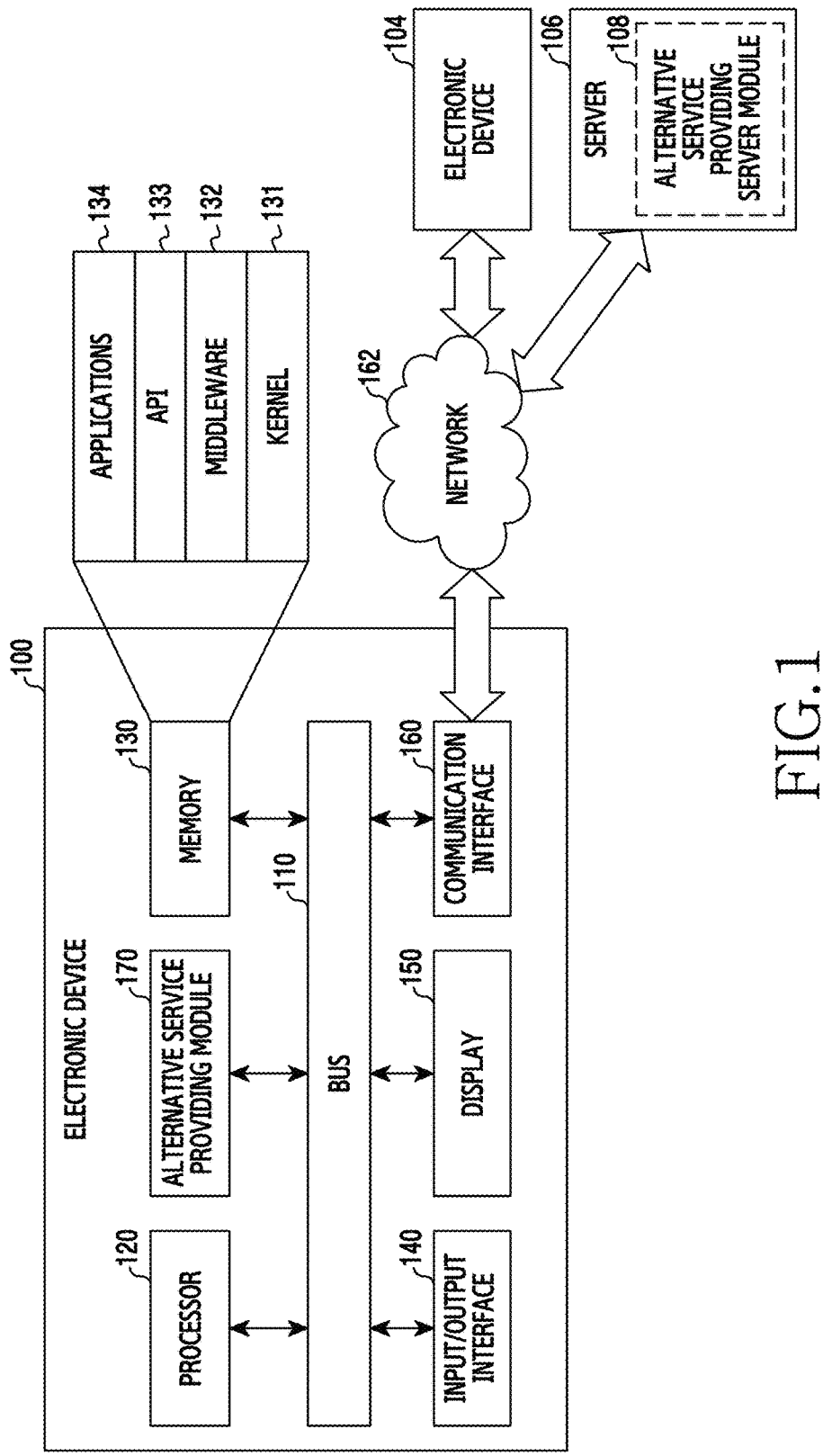
FIG. 1 is a structural block diagram of an example electronic device according to an embodiment of the present disclosure.

Hereinafter, various embodiments of the present disclosure will be described with reference to the accompanying drawings. The present disclosure may be modified in various forms and include various embodiments, but specific examples are illustrated in the drawings and described in the description. However, the description is not intended to limit the present disclosure to the specific embodiments, and it shall be appreciated that all the changes, equivalents and substitutions belonging to the present disclosure are included in the present disclosure. In the description of the drawings, identical or similar reference numerals are used to designate identical or similar elements.

The term "include" or "may include" refers to the existence of a corresponding disclosed function, operation or component which can be used in various embodiments of the present disclosure and does not limit one or more additional functions, operations, or components. In the present disclosure, the terms such as "include" or "have" may be construed to denote a certain characteristic, number, step, operation, constituent element, component or a combination thereof, but may not be construed to exclude the existence of or a possibility of addition of one or more other characteristics, numbers, steps, operations, constituent elements, components or combinations thereof.

In various embodiments of the present disclosure, the expression "or" or "at least one of A or/and B" includes any or all of combinations of words listed together. For example, the expression "A or B" or "at least A or/and B" may include A, may include B, or may include both A and B.

The expression "1", "2", "first", or "second" used in various embodiments of the present disclosure may modify various components of various embodiments but does not limit the corresponding components. For example, the above expressions do not limit the sequence and/or importance of the elements. The above expressions are used merely for the purpose of distinguishing an element from the other elements. For example, a first electronic device and a second electronic device indicate different electronic devices although both of them are electronic devices. For example, without departing from the present disclosure, a first component element may be named a second component element. Similarly, the second component element also may be named the first component element.

In the case where an element is referred to as being "connected" or "accessed" to other elements, it should be understood that not only the element is directly connected or accessed to the other elements, but also another element may exist between them. Meanwhile, in the case where an element is referred to as being "directly connected to" or "directly accessing" other elements, it should be understood that there is no element therebetween.

The terms in various embodiments of the present disclosure are used to describe a specific embodiment, and are not intended to limit the present disclosure. As used herein, the singular forms are intended to include the plural forms as well, unless the context clearly indicates otherwise.

Unless defined differently, all terms used herein, which include technical terminologies or scientific terminologies, have the same meaning as a person skilled in the art to which the present disclosure belongs. Such terms as those defined in a generally used dictionary are to be interpreted to have the meanings equal to the contextual meanings in the relevant field of art, and are not to be interpreted to have ideal or excessively formal meanings unless clearly defined in the present disclosure.

An electronic device according to various embodiments of the present disclosure may be a device with a communication function. For example, the electronic device may include at least one of a smart phone, a tablet Personal Computer (PC), a mobile phone, a video phone, an e-book reader, a desktop PC, a laptop PC, a netbook computer, a PDA, a Portable Multimedia Player (PMP), an MP3 player, a mobile medical device, a camera, a wearable device (for example, a Head-Mounted-Device (HMD) such as electronic glasses, electronic clothes, an electronic bracelet, an electronic necklace, an electronic appcessory, an electronic tattoo, or a smart watch.

According to some embodiments, the electronic device may be a smart home appliance with a communication function. The smart home appliance as an example of the electronic device may include at least one of a television, a Digital Video Disk (DVD) player, an audio, a refrigerator, an air conditioner, a vacuum cleaner, an oven, a microwave oven, a washing machine, an air cleaner, a set-top box, a TV box (e.g., Samsung HomeSync™, Apple TV™, or Google TV™), a game console, an electronic dictionary, an electronic key, a camcorder, or an electronic picture frame.

According to some embodiments, the electronic device may include at least one of various types of medical devices (for example, Magnetic Resonance Angiography (MRA), Magnetic Resonance Imaging (MRI), Computed Tomography (CT), a scanning machine, ultrasonic wave device and the like), a navigation device, a Global Positioning System (GPS) receiver, an Event Data Recorder (EDR), a Flight Data Recorder (FDR), a car infotainment device, ship electronic equipment (for example, navigation equipment for a ship, a gyro compass and the like), avionics, a security device, or an industrial or home robot.

According to another embodiment, the electronic devices may include at least one of furniture or a part of a building/structure having a communication function, electronic boards, electronic signature receiving devices, projectors, or various measuring equipment (e.g., equipment for a water supply, an electricity, gases or radio waves).

An electronic device according to various embodiments of the present disclosure may be a combination of one or more of above described various devices. Also, an electronic device according to various embodiments of the present disclosure may be a flexible device. Also, an electronic device according to various embodiments of the present disclosure is not limited to the above described devices.

Hereinafter, an electronic device according to various embodiments will be described with reference to the accompanying drawings. The term "user" used in various embodiments may refer to a person who uses an electronic device or a device (for example, an artificial intelligence electronic device) that uses an electronic device.

FIG. 1 is a block diagram of an electronic device according to an embodiment of the present disclosure.

Referring to FIG. 1, the electronic device 100 may include a bus 110, a processor 120, a memory 130, an input/output interface 140, a display 150, a communication interface 160, and an alternative service providing module 170. According to an embodiment, the alternative service providing module 170 may be included in the processor 120 to operate or may be included in a separate module to interwork with the processor 120.

The bus 110 may be a circuit that interconnects the above-described components and delivers communications (for example, a control message) between the above-described components.

The processor 120 may, for example, receive a command from other components (for example, the memory 130, the input/output interface 140, the display 150, the communication interface 160, the alternative service providing module 170, etc.), through the bus 110, decrypt the received command, and execute operation or data processing based on the decrypted command.

The memory 130 may store a command or data received from the processor 120 or other components (for example, the input/output interface 140, the display 150, the communication interface 160, the alternative service providing module 170, and the like), or generated by the processor 120 or other components.

The memory 130 may include programming modules, for example, a kernel 131, a middleware 132, an Application Programming Interface (API) 133, an application 134, and the like. Each of the aforementioned programming modules may be formed of software, firmware, hardware, or a combination of at least two thereof.

According to an embodiment, the kernel 131 may control or manage system resources, for example, the bus 110, the processor 120, the memory 130, and the like, used for executing an operation or function implemented in other programming modules, for example, the middleware 132, the API 133, or the applications 134. Also, the kernel 131 may provide an interface that enables the middleware 132, the API 133, or the applications 134 to access an individual component of the electronic device 100 for control or management.

According to an embodiment, the middleware 132 may operate as a relay so that the API 133 or the applications 134 communicates to exchange data with the kernel 131. Also, in association with operation requests received from the application 134, the middle ware 132 may execute a control, for example, scheduling or load balancing, for an operation request, through use of, for example, a method of assigning, to at least one of application 134, a priority of use of a system resource of the electronic device 100, for example, the bus 110, the processor 120, the memory 130, or the like).

According to an embodiment, the API 133 is an interface used by the applications 134 to control a function provided from the kernel 131 or the middleware 132, and may include, for example, at least one interface or function, for example, an instruction, for a file control, a window control, image processing, a character control, or the like.

According to an embodiment, the applications 134 may include a Short Message Service (SMS)/Multimedia Message Service (MMS) application, an e-mail application, a calendar application, an alarm application, a health care application (for example, an application for measuring a work rate or a blood sugar), an environment information application (for example, an application for providing atmospheric pressure, humidity, or temperature information). Additionally or alternatively, the application 134 may be an application associated with exchanging of information between the electronic device 100 and an external electronic device (for example, an electronic device 104). The application related to the information exchange may include, for example, a notification transmission application for transferring predetermined information to an external electronic device or a device management application for managing an external electronic device.

For example, the notification relay application may include a function of transferring, to the external electronic device, for example, the electronic device 104, notification information generated from other applications of the electronic device 100, for example, an SMS/MMS application, an e-mail application, a health management application, an environmental information application, and the like. Additionally or alternatively, the notification relay application may receive notification information from, for example, an external electronic device (for example, the electronic device 104), and may provide the notification information to a user. For example, the device management application may manage (for example, install, delete, or update) a function for at least some parts of the external electronic device (for example, the electronic device 104) communicating with the electronic device 100 (for example, a function of turning on/off the external electronic device itself, or some components, or a function of adjusting luminance or a resolution of the display), applications operating in the external electronic device, or services provided by the external electronic device (for example, a call service and a message service).

According to various embodiments, the applications 134 may include an application designated based on properties (for example, a type of electronic device) of an external electronic device (for example, the electronic device 104). For example, when the external electronic device is an MP3 player, the application 134 may include an application related to the reproduction of music. Similarly, when the external electronic device is a mobile medical device, the application 134 may include an application related to health care. According to one embodiment, the applications 134 may include at least one of applications received from an application designated for the electronic device 100 or an application received from an external electronic device (for example, a server 106 or the electronic device 104).

According to an embodiment, the input/output interface 140 may transfer a command or data input by a user through an input/output device (for example, a sensor, a keyboard, or a touch screen) to the processor 120, the memory 130, the communication interface 160, and the alternative service providing module 170, for example, through the bus 110. For example, the input/output interface 140 may provide, to the processor 120, data associated with a touch of a user input through a touch screen. Further, the input/output interface 140 may output, for example, command or data received through the bus 110 from the processor 120, the memory 130, the communication interface 160, and the alternative service providing module 170, to an input/output device (for example, a speaker or display). For example, the input/output interface 140 may output voice data processed by the processor 120 to the user through a speaker.

According to one embodiment, the display 150 may display various pieces of information (for example, multimedia data, text data, and the like) to a user.

According to one embodiment, the communication interface 160 may connect communication between the electronic device 100 and an electronic device (for example, the electronic device 104 or the server 106). For example, the communication interface 160 may be connected to the network 162 through wireless communication or wired communication, and may communicate with an external device. The wireless communication may include at least one of, for example, Wi-Fi, Bluetooth (BT), Near Field Communication (NFC), Global Positioning System (GPS) or cellular communication (for example LTE, LTE-A, CDMA, WCDMA, UMTS, WiBro, GSM, etc.). The wired communication may include at least one of, for example, a Universal Serial Bus (USB), a High Definition Multimedia Interface (HDMI), a Recommended Standard 232 (RS-232), or a Plain Old Telephone Service (POTS).

According to one embodiment, the network 162 may be a communication network. The telecommunication network may include at least one of a computer network, Internet, Internet of things, or a telephone network. According to one embodiment, a protocol (for example, a transport lay protocol, data link layer protocol, or a physical layer protocol) for communication between the electronic device 100 and the external device may be supported by at least one of the applications 134, the application programming interface 133, the middleware 132, the kernel 131, or the communication interface 160.

Figure 3:
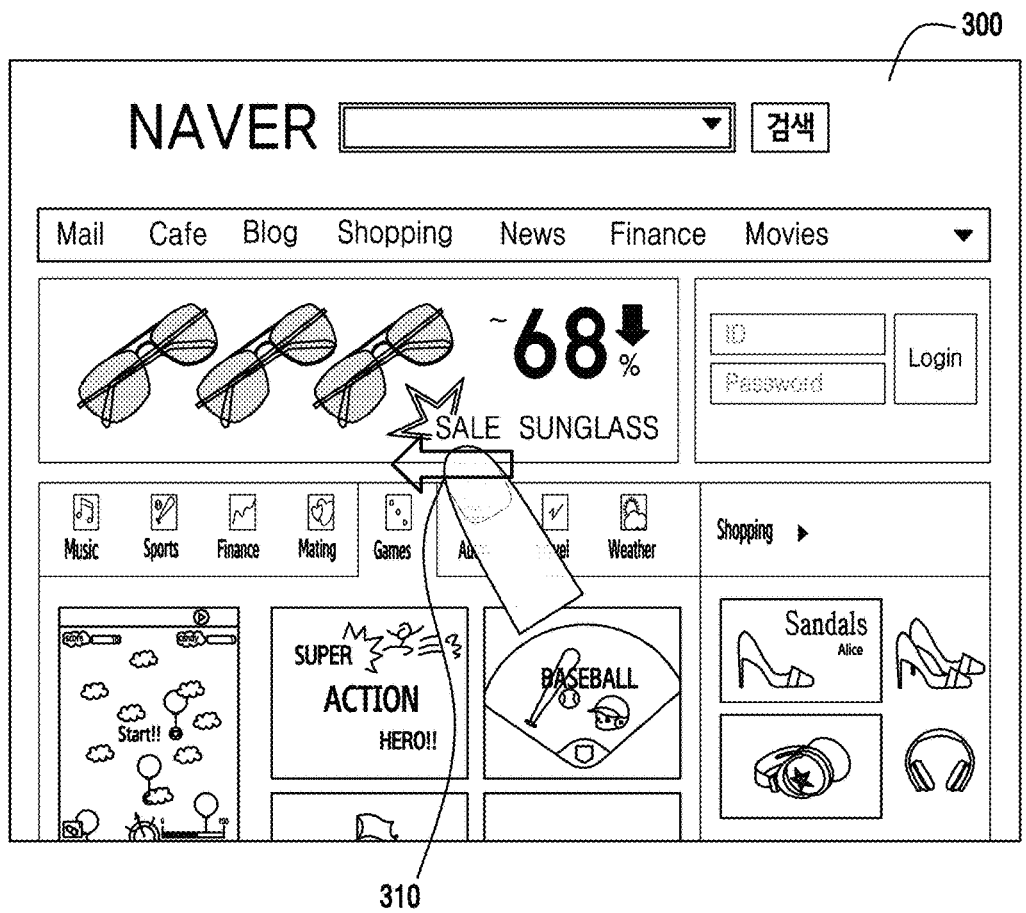
FIG. 3 illustrates an example screen configuration for a user input on a webpage according to an embodiment of the present disclosure.

According to one embodiment, the alternative service providing module 170 may include a software component for providing an alternative service to a user when an electronic document is used. For example, the alternative service providing module 170 may determine attribute information of the electronic document and provide an alternative service which does not correspond to the corresponding attribute information to the user. According to one embodiment, the alternative service providing module 170 may focus (e.g., select or activate) a desired field (e.g., a component of the document) according to a user input 310 (for example, a tap or a swipe action) on a webpage 300, as illustrated in FIG. 3. When there are automatically reproduced multimedia content or an automatic popups in the webpage 300, the alternative service providing module 170 may deactivate the multimedia contents or the automatic popup. For example, when there is alternative audio data, such as audio extraction or script corresponding to a video in the webpage 300, the alternative service providing module 170 may reproduce the alternative audio data instead. However, the present disclosure is not limited thereto, and the alternative service providing module 170 may provide various other services described below.

According to an embodiment, the server 106 may support operations of the electronic device 100 by conducting at least one of the operations (or functions) implemented by the electronic device 100. For example, the server 106 may include another alternative service providing server module 108 which may support the alternative service providing module 170 implemented by the electronic device 100. According to an embodiment, the alternative service providing server module 108 may include one or more components of the alternative service providing module 170 to perform (on behalf of the alternative service providing module 170) at least one of the operations of the alternative service providing module 170.

According to an embodiment, the alternative service providing module 170 may process at least some of information acquired from other components (for example, the processor 120, the memory 130, the input/output interface 140, the communication interface 160, or the like) and may provide some of the processed information to a user in various schemes. For example, the alternative service providing module 170 may control at least some functions of the electronic device 100 by using the processor 120 or independently therefrom so that the electronic device 100 may interoperate with other electronic devices (for example, the electronic device 104 or the server 106). According to an embodiment, at least one component of the alternative service providing module 170 may be included in the server 106 (for example, the alternative service providing server module 108) and receive supporting of at least one operation implemented by the alternative service providing module 170 from the server 106.

Figure 2:
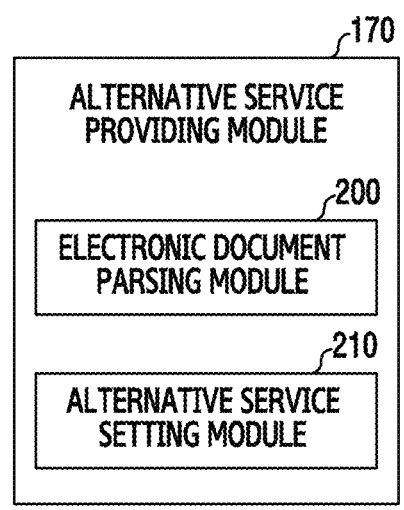
FIG. 2 is a block diagram of an example alternative service providing module according to an embodiment of the present disclosure.

FIG. 2 is a block diagram of the alternative service providing module according to an embodiment of the present disclosure.

Referring to FIG. 2, the alternative service providing module 170 may include an electronic document parsing module 200, and an alternative service setting module 210.

According to an embodiment, the electronic document parsing module 200 may determine (or detect) attribute information of an electronic document (for example, URL link information, frame information, tag information, image information, hyperlink information, script information, active X control, and java applet) by parsing the electronic document. For example, the electronic document parsing module 200 may parse data by using HTML information acquired through a webpage and extract text and tag information. According to an embodiment, the electronic document parsing module 200 may store various tag information (for example, "id", "inputPwd", "embed", "bgsound", and the like) included in the HTML in a memory, and classify hyperlinks according to attributes thereof (for example, respective formats for each component in the electronic document, such as document, video media or service, site address, CAPTCHA, and the like).

According to an embodiment, the electronic document parsing module 200 may parse an image displayed in the electronic document and extract text. According to an embodiment, the electronic document parsing module 200 may parse a particular image by using an image processor and extract text from the particular image. For example, the electronic document parsing module 200 may parse an image included in a popup window, extract text from the image, and store the extracted text in a memory.

According to an embodiment, the alternative service setting module 210 may provide a service, which corresponds to attribute information, or set an alternative service (e.g., providing an alternative notification), which does not correspond to the attribute information, based on attribute information parsed through the electronic document parsing module 200. According to an embodiment, when there are automatically reproduced multimedia contents or an automatic popup in the webpage based on a result of the determination of the attribute information, the alternative service setting module 210 may deactivate the multimedia contents or the popup. Further, the alternative service setting module 210 may give a guide to the user for selective reproduction and execution of the multimedia contents or popup. According to an embodiment, when there are image contents such as a video in the webpage based on a result of the determination of the attribute information, the alternative service setting module 210 may deactivate the image contents or execute alternative contents. For example, when alternative audio data such as audio extraction or script corresponding to the video in the webpage exists, the alternative service setting module 210 may reproduce the alternative audio data instead (e.g., switching from a visual notification to the alternative audio notification). According to an embodiment, the alternative service setting module 210 may identify whether there is alternative audio data in the webpage or server by using information extracted from a tag (for example, a video name or address) when the video in the webpage is reproduced. When the alternative audio data exists, the audio data may be reproduced according to a selection by the user. According to an embodiment, when there is Reverse Turing test, such as "captcha" information, in the webpage as a result of the determination of the attribute information, the alternative service setting module 210 may transmit the corresponding captcha (e.g., reverse Turing) information to a phone number of the user stored in a phone number book. According to an embodiment, the alternative service setting module 210 may transmit captcha information to the user related to an SNS to share (e.g., transmit) the captcha information. For example, a counterpart electronic device may receive a captcha image transmitted from the electronic device and transmit a particular character according to the received captcha image to the electronic device. According to an embodiment, when there is a link error in the webpage as a result of the determination of the attribute information, the alternative service setting module 210 may re-arrange indexes of fields displayed in the webpage with reference to absolute positions of the fields (for example, link, image, text, and the like) displayed on the screen, a display format according to language, and the like. According to an embodiment, the alternative service setting module 210 may re-arrange the indexes through a scheme of deleting all indexes of the corresponding fields to initialize the indexes. For example, the alternative service setting module 210 may smoothly make movement between the fields in the webpage by changing all indexes of the corresponding fields into "0". According to an embodiment, when there is a security input window based on a result of the determination of the attribute information, the alternative service setting module 210 may output a security notification message as a sound. According to an embodiment, when there is a security information input window, the alternative service setting module 210 may inform of a notification message indicating to mount an ear-set/earphones or a headset/headphones through a voice. According to an embodiment, the alternative service setting module 210 may generate a vibration or output a specific effect sound as an alarm according to an input of security information. According to an embodiment, when the user inputs security information into the security input window, the alternative service setting module 210 may make a control to not output a voice according to the input security information. According to an embodiment, the alternative service setting module 210 may display an input window for receiving an input through a particular input means. For example, the alternative service setting module 210 may display an input window for receiving an input through an input pen (for example, a stylus) and the user may input security information into the input window by using the input pen. In another example, the alternative service setting module 210 may display an input window for receiving an input through a particular gesture and receive security information based on the particular gesture from the user.

The electronic device according to various embodiments of the present disclosure may include: a display unit; and a processor configured to: parse attribute information of an electronic document displayed on the display unit, when a component of the electronic document is activated, detect a format of the activated component based on the parsed attribute information, and when the detected format indicates visual media, output an alternative notification comprising at least one a notification in a different format than the detected format.

According to various embodiments, parsing the attribute information further comprises parsing tag information of HTML information of the electronic document.

According to various embodiments, parsing the tag information of the HTML information further comprises: classifying components of the electronic document to identify respective formats of each of the components according to the tag information.

According to various embodiments, when the visual media comprises a video service, generating the alternative notification further comprises: deactivating a visual portion of the video service; and generating and outputting alternative audio content of the video service.

According to various embodiments, when the visual media comprises a service for entering sensitive information, generating the alternative notification further comprises outputting a security notification sound indicating the service for entering sensitive information.

According to various embodiments, generating the alternative notification further comprises displaying an input window for entering the sensitive information on a display.

According to various embodiments, when the visual media comprises a captcha service, generating the alternative notification further comprises transmitting the captcha information to a counterpart electronic device.

According to various embodiments, when the visual media comprises an image displayed on the electronic document, generating the alternative notification further comprises extracting text included within the displayed image.

According to various embodiments, generating the alternative notification further comprises converting the extracted text into audio information and audibly outputting the audio information.

According to various embodiments, the component of the electronic document is activated when an input is detected to the electronic document disposed on the component.

Figure 4:
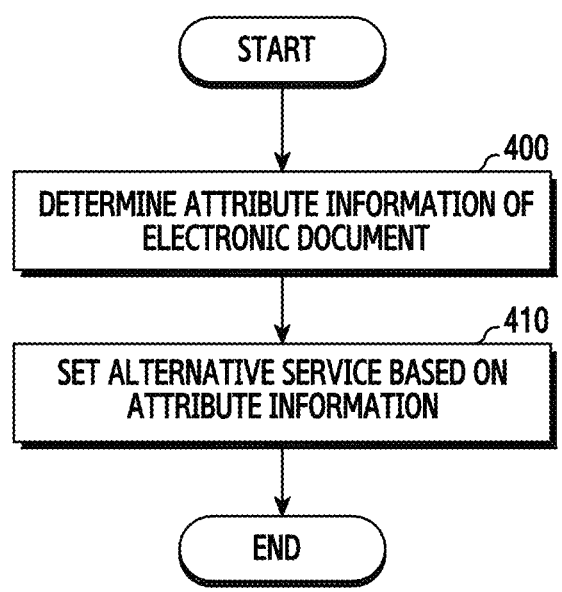
FIG. 4 is a flowchart illustrating an example method of providing an alternative service according to an embodiment of the present disclosure.

FIG. 4 is a flowchart illustrating a method of providing an alternative service according to an embodiment of the present disclosure.

Referring to FIG. 4, the electronic device (for example, the electronic device 100) may determine attribute information of the electronic document in operation 400. According to an embodiment, the electronic device may receive HTML information of a webpage through a web browser, and determine attribute information of the webpage (for example, URL link information, frame information, tag information, image information, hyperlink information, script information, active X control, and java applet) by parsing the received HTML information. According to an embodiment, the electronic device may store the received HTML information in a memory.

In operation 410, the electronic device may set an alternative service based on the attribute information. According to an embodiment, when there are automatically reproduced multimedia contents or an automatic popup in the webpage based on a result of the determination of the attribute information, the electronic device may deactivate the multimedia content or the popups. Further, the electronic device may generate a guide to the user for selective reproduction and execution of the multimedia content or popups. According to an embodiment, when there are image contents such as a video in the webpage based on a result of the determination of the attribute information, the electronic device may deactivate the image contents or execute alternative contents. For example, when alternative audio data such as audio extraction or script corresponding to the video in the webpage exists, the electronic device may reproduce the alternative audio data instead. According to an embodiment, the electronic device may identify whether there is alternative audio data in the webpage or server by using information extracted from a tag (for example, a video name or address) when the video in the webpage is reproduced. When the alternative audio data detected, the audio data may be reproduced according to a selection by the user. According to an embodiment, when there is captcha information in the webpage as a result of the determination of the attribute information, the electronic device may transmit the corresponding captcha information to a phone number of the user stored in a phone number book. According to an embodiment, the electronic device may transmit captcha information to the user related to an SNS to share the captcha information. For example, a counterpart electronic device may receive a captcha image transmitted from the electronic device and transmit a particular character according to the received captcha image to the electronic device. According to an embodiment, when there is a link error in the webpage as a result of the determination of the attribute information, the electronic device may re-arrange indexes of fields displayed in the webpage with reference to absolute positions of the fields (for example, link, image, text, and the like) displayed on the screen, a display format according to language, and the like. According to an embodiment, the electronic device may re-arrange the indexes through a scheme of deleting all indexes of the corresponding fields to initialize the indexes. For example, the electronic device may smoothly make movement between the fields in the webpage by changing all indexes of the corresponding fields into "0". According to an embodiment, when there is a security input window based on a result of the determination of the attribute information, the electronic device may output a security notification message as a sound. According to an embodiment, when there is a security information input window, the electronic device may inform of a notification message indicating to mount an ear-set/earphones or a headset/headphone through a voice. According to an embodiment, the electronic device may generate a vibration or output a specific effect sound as an alarm according to an input of security information. According to an embodiment, when the user inputs security information into the security input window, the electronic device may make a control to not output a voice according to the input security information. According to an embodiment, the electronic device may display an input window for receiving an input through a particular input means. For example, the electronic device may display an input window for receiving an input through an input pen (for example, a stylus) and the user may input security information into the input window by using the input pen. In another example, the electronic device may display an input window for receiving an input through a particular gesture and receive security information based on the particular gesture from the user.

Figure 5:
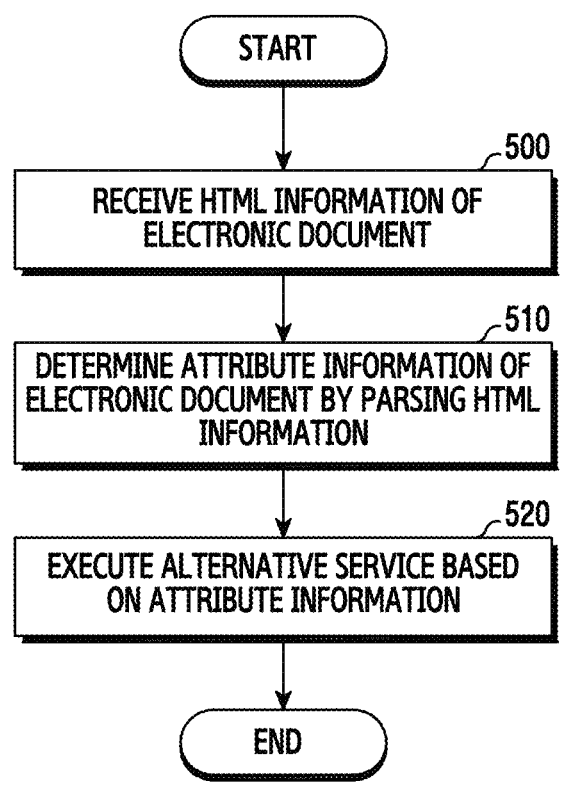
FIG. 5 is a flowchart illustrating an example method of providing an alternative service according to an embodiment of the present disclosure.

FIG. 5 is a flowchart illustrating a method of providing an alternative service according to an embodiment of the present disclosure.

Referring to FIG. 5, the electronic device (for example, the electronic device 100) may receive Hypertext Markup Language (HTML) information of an electronic document in operation 500. According to an embodiment, the electronic device may execute a web browser and receive HTML information of a webpage through the executed web browser. According to an embodiment, the electronic device may store the received HTML information in a memory.

In operation 510, the electronic device may determine attribute information of the electronic document by parsing the HTML information. According to an embodiment, the electronic device may determine attribute information of the webpage (for example, URL link information, frame information, tag information, image information, hyperlink information, script information, active X control, and java applet) by parsing the received HTML information.

In operation 520, the electronic device may execute an alternative service based on the attribute information. According to an embodiment, when there are automatically reproduced (e.g., generated) multimedia content or an automatic popups in the webpage based on a result of the determination of the attribute information, the electronic device may deactivate the multimedia contents or the popups. Further, the electronic device may generate an alternative guide to the user for selective reproduction and execution of the multimedia content or popups. According to an embodiment, when there are image-based content such as a video in the webpage based on a result of the determination of the attribute information, the electronic device may deactivate the image contents or execute alternative contents. For example, when alternative audio data such as audio extract or script corresponding to the video in the webpage exists, the electronic device may reproduce the alternative audio data instead. According to one embodiment, the electronic device may identify whether there is alternative audio data in the webpage or server by using information extracted from a tag (for example, a video name or address) when the video in the webpage is reproduced. When the alternative audio data exists, the audio data may be reproduced according to a selection by the user. According to an embodiment, when there is captcha information in the webpage as a result of the determination of the attribute information, the electronic device may transmit the corresponding captcha information to a phone number of the user stored in a phone number book. According to an embodiment, the electronic device may transmit captcha information to the user related to an SNS to share the captcha information. For example, a counterpart electronic device may receive a captcha image transmitted from the electronic device and transmit a particular character according to the received captcha image to the electronic device. According to an embodiment, when there is a link error in the webpage as a result of the determination of the attribute information, the electronic device may re-arrange indexes of fields displayed in the webpage with reference to absolute positions of the fields (for example, link, image, text, and the like) displayed on the screen, a display format according to language, and the like. According to an embodiment, the electronic device may re-arrange the indexes through a scheme of deleting all indexes of the corresponding fields to initialize the indexes. For example, the electronic device may smoothly make movement between the fields in the webpage by changing all indexes of the corresponding fields into "0". According to an embodiment, when there is a security input window based on a result of the determination of the attribute information, the electronic device may output a security notification message as a sound. According to an embodiment, when there is a security information input window, the electronic device may inform of a notification message indicating to mount an ear-set/earphones or a headset/headphone through a voice. According to an embodiment, the electronic device may generate a vibration or output a specific effect sound as an alarm according to an input of security information. According to an embodiment, when the user inputs security information into the security input window, the electronic device may make a control to not output a voice according to the input security information. According to an embodiment, the electronic device may display an input window for receiving an input through a particular input means. For example, the electronic device may display an input window for receiving an input through an input pen (for example, a stylus) and the user may input security information into the input window by using the input pen. In another example, the electronic device may display an input window for receiving an input through a particular gesture and receive security information from the user based on the particular gesture.

Figure 6:
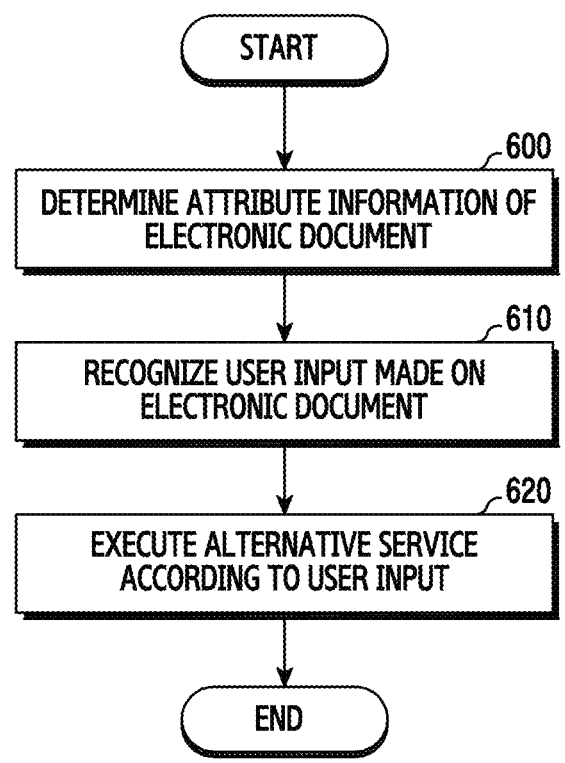
FIG. 6 is a flowchart illustrating an example method of providing an alternative service according to an embodiment of the present disclosure.

FIG. 6 is a flowchart illustrating a method of providing an alternative service according to an embodiment of the present disclosure.

Referring to FIG. 6, the electronic device (for example, the electronic device 100) may determine attribute information of an electronic document in operation 600. For example, the electronic device may receive Hypertext Markup Language (HTML) information of the electronic document. According to an embodiment, the electronic device may execute a web browser and receive HTML information of a webpage through the executed web browser. According to an embodiment, the electronic device may store the received HTML information in a memory. According to an embodiment, the electronic device may determine attribute information of the webpage (for example, URL link information, frame information, tag information, image information, hyperlink information, script information, active X control, and java applet) by parsing the received HTML information.

Figure 7:
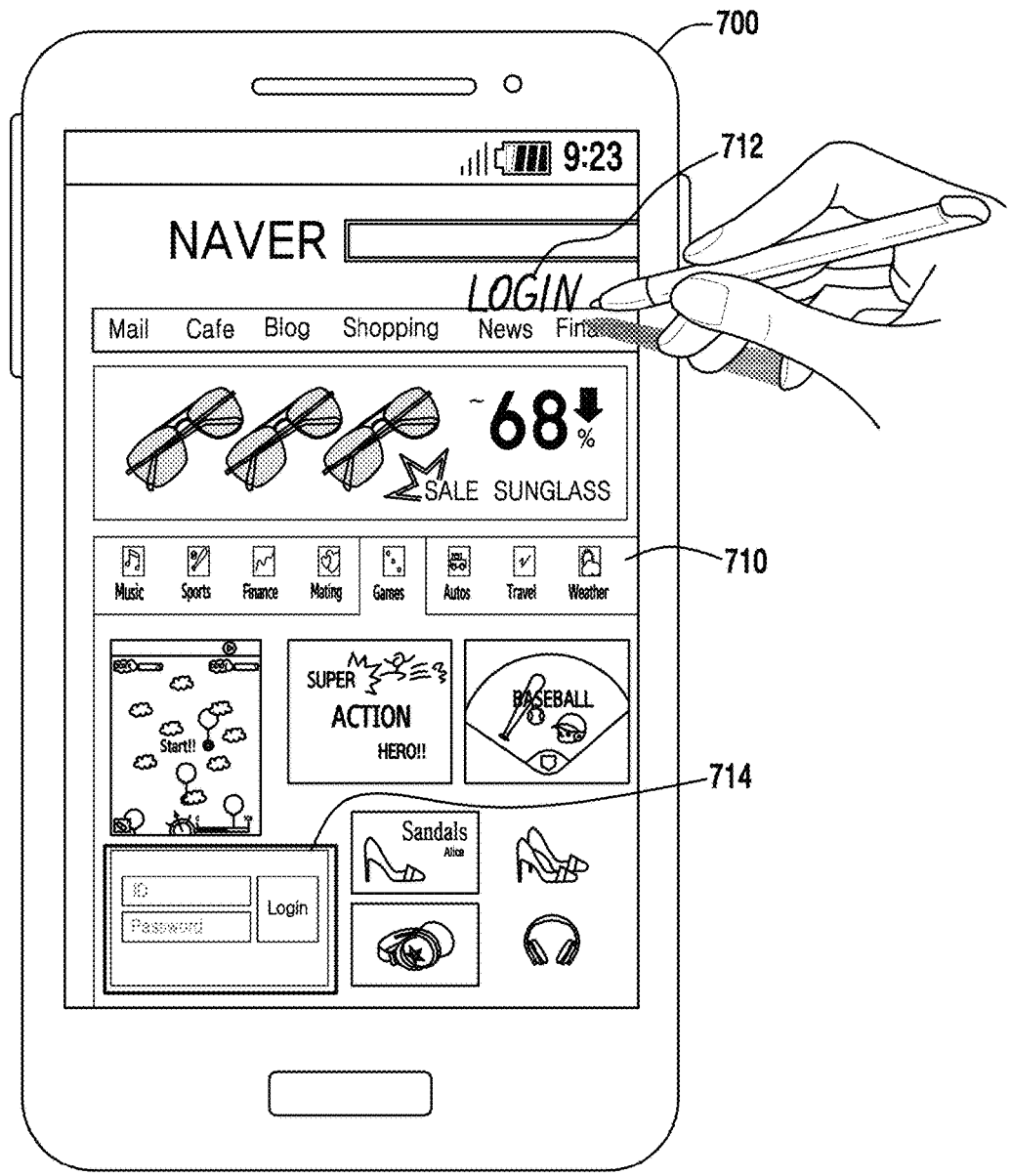
FIG. 7 illustrates an example screen configuration for providing an alternative service according to an embodiment of the present disclosure.

In operation 610, the electronic device may recognize a user input made on the electronic document. According to an embodiment, an electronic device 700 may detect a user input 712 made on an electronic document 710 as illustrated in FIG. 7. For example, the user may input particular characters such as "LOGIN" by using an input pen (for example, a stylus) on the electronic document 710. According to another embodiment, the electronic device 700 may receive a particular voice corresponding to "LOGIN" on the electronic document 710. According to another embodiment, the electronic device 700 may parse the particular characters or particular voice and compare the parsed characters or voice with HTML information stored in a memory.

In operation 620, the electronic device may execute an alternative service according to the user input. According to an embodiment, when the electronic device 700 receives a particular input (text input or voice input) such as "LOGIN" on the electronic document 710 as illustrated in FIG. 7, the electronic device 700 may search for data having similarity with "LOGIN" and move a focus to a corresponding position 714. According to an embodiment, when the electronic device 700 receives a particular input, the electronic device 700 may execute an application related to the corresponding input. According to an embodiment, the electronic device may perform natural language processing on all of information extracted from web data and information input by the user in order to increase the search accuracy.

In the present embodiment, although a particular word such as "LOGIN" has been described, the present disclosure is not limited thereto and various words can be applied. Further, in the present embodiment, although the user input is made through the input pen or the user input corresponds to the voice input, various gesture inputs are also applied.

Figure 8:
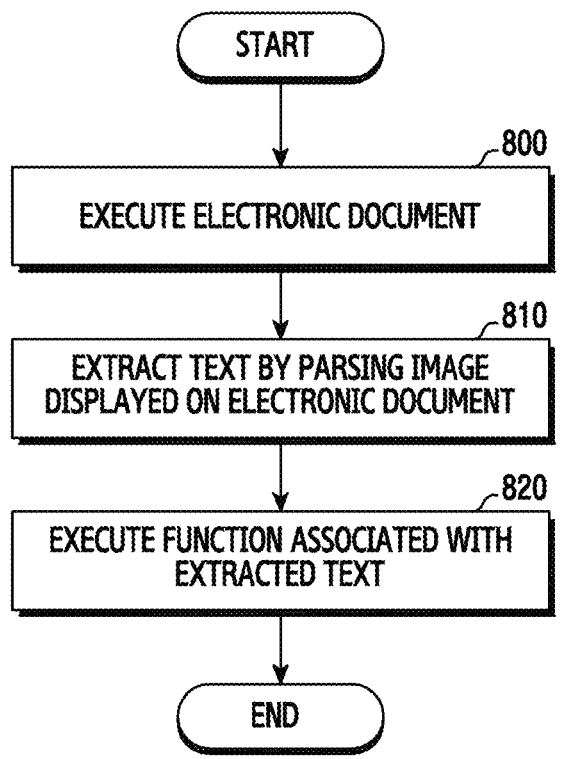
FIG. 8 is a flowchart illustrating an example method of providing an alternative service according to an embodiment of the present disclosure.

FIG. 8 is a flowchart illustrating a method of providing an alternative service according to an embodiment of the present disclosure.

Referring to FIG. 8, the electronic device (for example, the electronic device 100) may execute an electronic document in operation 800. For example, the electronic device may execute a web browser for using a web service. According to an embodiment, the electronic device may receive Hypertext Markup Language (HTML) information of a webpage through the executed web browser. According to an embodiment, the electronic device may store the received HTML information in a memory. According to an embodiment, the electronic device may determine attribute information of the webpage (for example, URL link information, frame information, tag information, image information, hyperlink information, script information, active X control, and java applet) by parsing the received HTML information.

Figure 9:
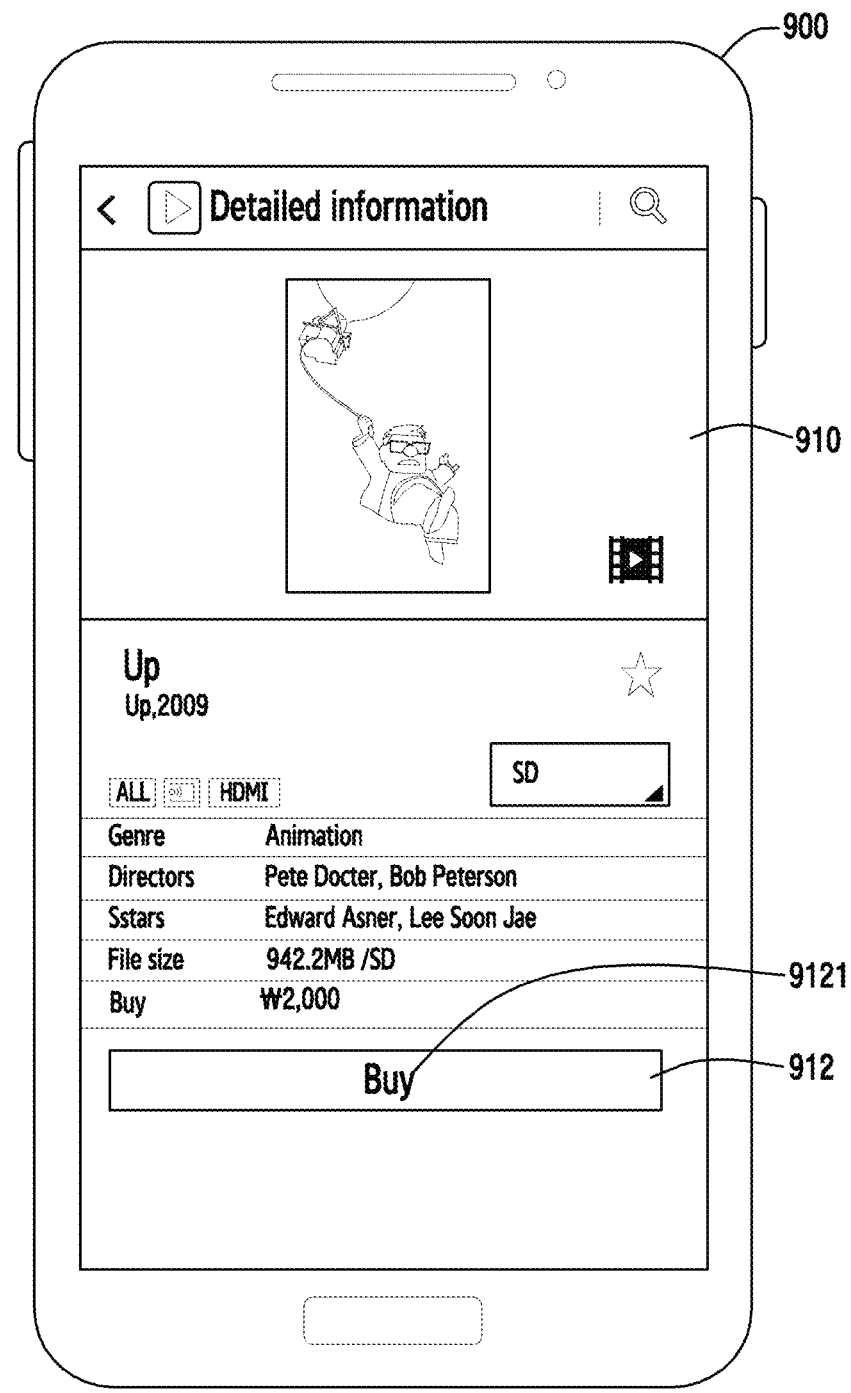
FIG. 9 illustrates an example screen configuration for providing an alternative service according to an embodiment of the present disclosure.

In operation 810, the electronic device may extract text by parsing an image displayed in the electronic document. According to an embodiment, an electronic device 900 may select a particular image 912 displayed in a webpage 910 as illustrated in FIG. 9. For example, the particular image 912 may be an image button for a link in the webpage 910. In another example, the particular image 912 may be an object having no tag information for a voice conversion service. However, the present disclosure is not limited thereto, and the particular image 912 may be an object movement to another webpage or a particular function. According to an embodiment, the electronic device 900 may parse the particular image 912 by using an image processor and extract text 9121 included in the particular image 912. According to an embodiment, a popup window 1000 illustrated in FIG. 10 may be displayed while the electronic device executes the webpage. The popup window 1000 may include text, an emoticon, or an image 1010 for providing a coupon, a gift-icon, and the like. According to an embodiment, as described above, the electronic device may parse the image 1010 included in the popup window 1000 and extract text 1012 included in the image 1010.

Figure 10:
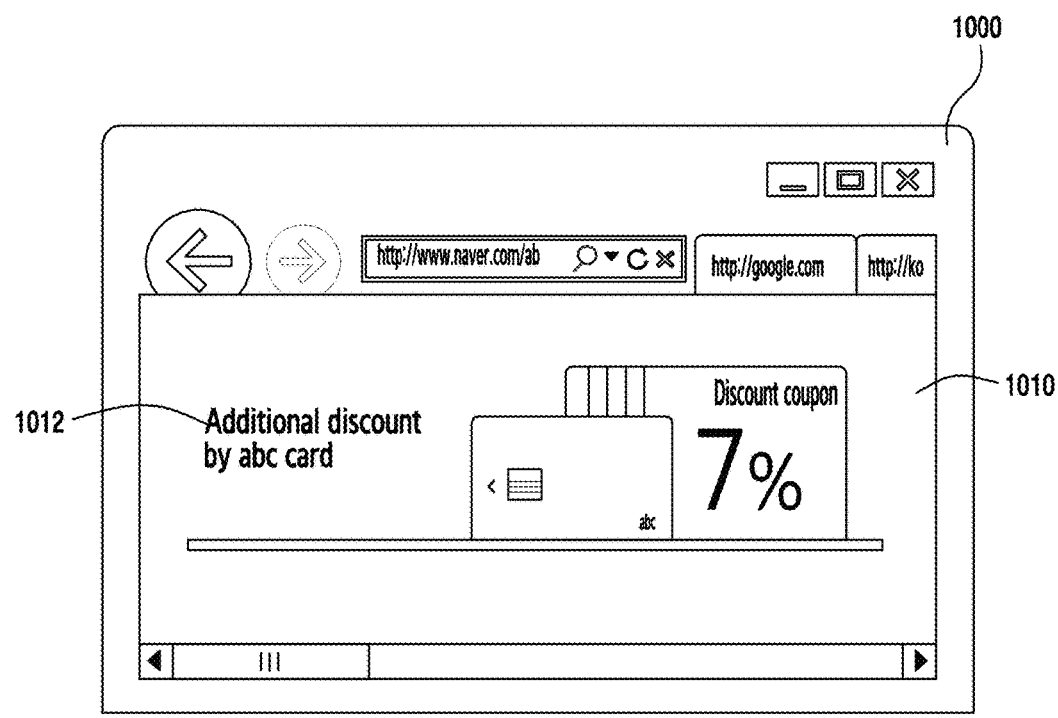
FIG. 10 illustrates an example screen configuration for providing an alternative service according to an embodiment of the present disclosure.

In operation 820, the electronic device may perform a function associated with the extracted text. According to an embodiment, when the extracted text corresponds to "buy" as illustrated in FIG. 9, the electronic device 900 may convert text into a voice signal by using a Text To Speech (TTS) function. For example, when the user selects the particular image 912, the electronic device 900 may output "buy" through a voice. According to an embodiment, when the extracted text corresponds to "additional discount by abc card" as illustrated in FIG. 10, the electronic device may also extract "additional discount by abc card" through a voice by using the TTS function. According to an embodiment, when the corresponding popup window includes an image associated with the coupon or gift-icon from the extracted text, the electronic device may omit the corresponding popup window. Further, the electronic device may output a notification message indicating whether to close the corresponding popup window through a voice.

Figure 11:
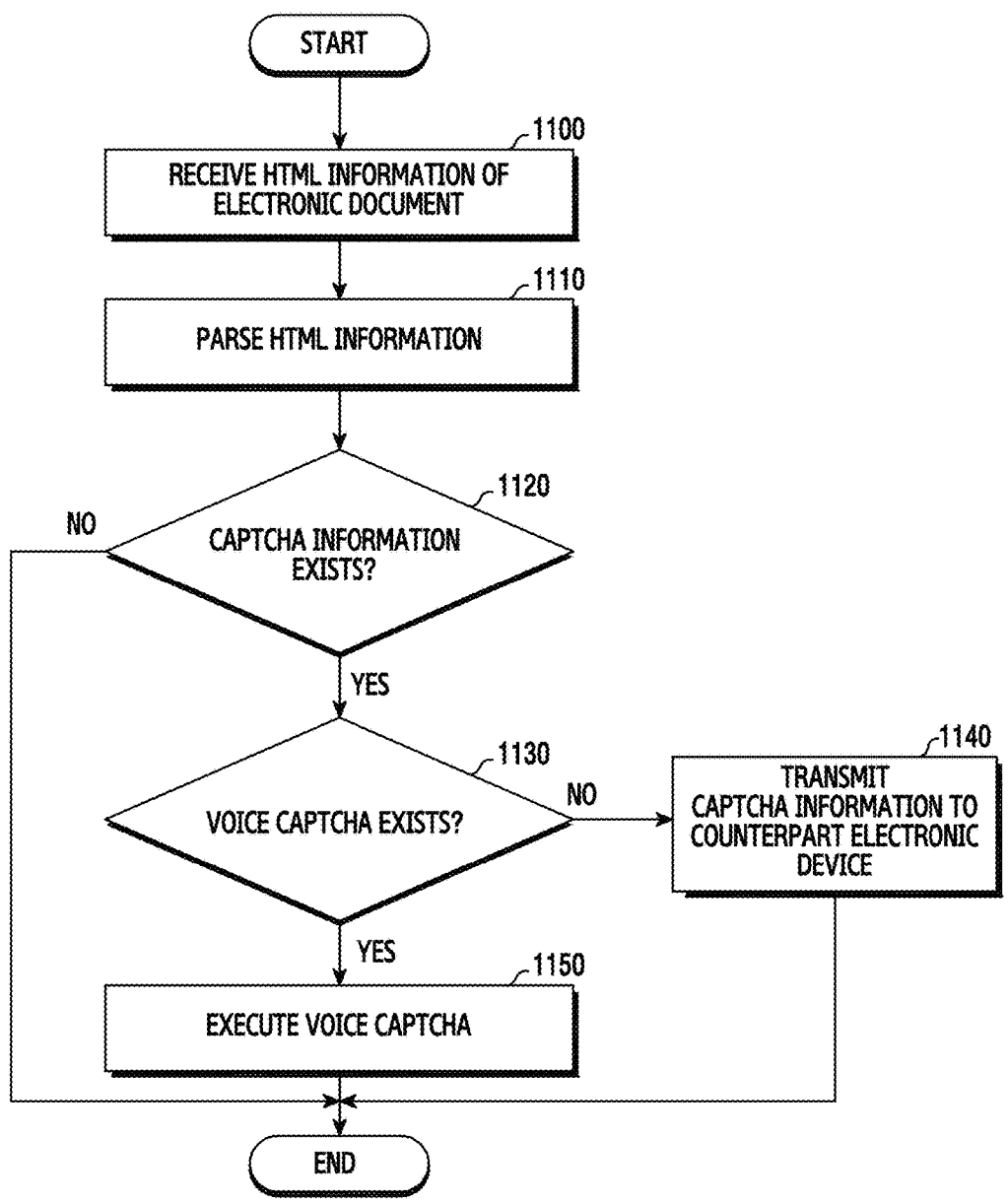
FIG. 11 is a flowchart illustrating an example method of providing an alternative service according to an embodiment of the present disclosure.

FIG. 11 is a flowchart illustrating a method of providing an alternative service according to an embodiment of the present disclosure.

Referring to FIG. 11, the electronic device (for example, the electronic device 100) may receive Hypertext Markup Language (HTML) information of an electronic document in operation 1100. According to an embodiment, the electronic device may execute a web browser and receive HTML information of a webpage through the executed web browser. According to an embodiment, the electronic device may store the received HTML information in a memory.

In operation 1110, the electronic device may parse the HTML information. According to an embodiment, the electronic device may determine attribute information of the webpage (for example, URL link information, frame information, tag information, image information, hyperlink information, script information, active X control, and java applet) by parsing the received HTML information.

Figure 12:
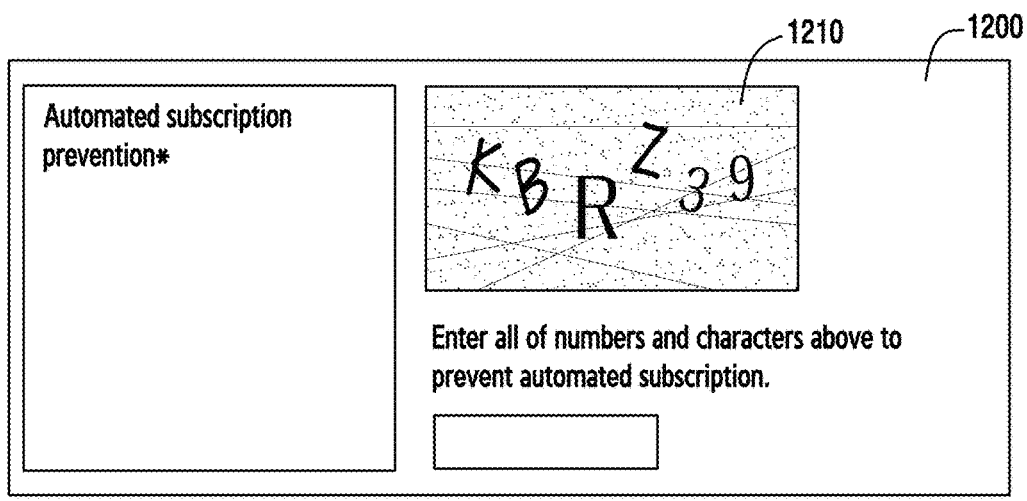
FIG. 12 illustrates an example screen configuration for providing an alternative service according to an embodiment of the present disclosure.

In operation 1120, the electronic device may determine whether there is captcha information in the webpage. For example, the electronic device may determine whether the captcha information exists by searching for HTML information stored in the memory. According to an embodiment, the electronic device may identify whether captcha exists by using patterns of tags existing in the HTML information or information accumulated in the server. For example, as seen in FIG. 12, the received HTML information may include captcha information for displaying, in the webpage, captcha 1200 for a function of preventing automated subscription.

When the captcha information exists, the electronic device may determine whether voice captcha exists in operation 1130. For example, the captcha information may include voice captcha for blind people and the electronic device may output a voice corresponding to particular characters to the user through the voice captcha.

When voice captcha exists, the electronic device may execute the voice captcha in operation 1150. According to an embodiment, the user may perform an authentication by recognizing the particular characters output as the voice.

When the voice captcha does not exist, the electronic device may transmit captcha information to the counterpart electronic device in operation 1140. According to an embodiment, the electronic device may transmit the corresponding captcha information to a phone number of the user stored in a phone number book of the electronic device. According to an embodiment, the electronic device may transmit captcha information to the user related to an SNS to share the captcha information. For example, referring again to FIG. 12, the counterpart electronic device may receive a captcha image 1210 transmitted from the electronic device and transmit particular characters according to the received captcha image 1210 to the electronic device. However, the present disclosure is not limited thereto, and the electronic device may share the captcha information with the counterpart electronic device through various methods.

Figure 13:
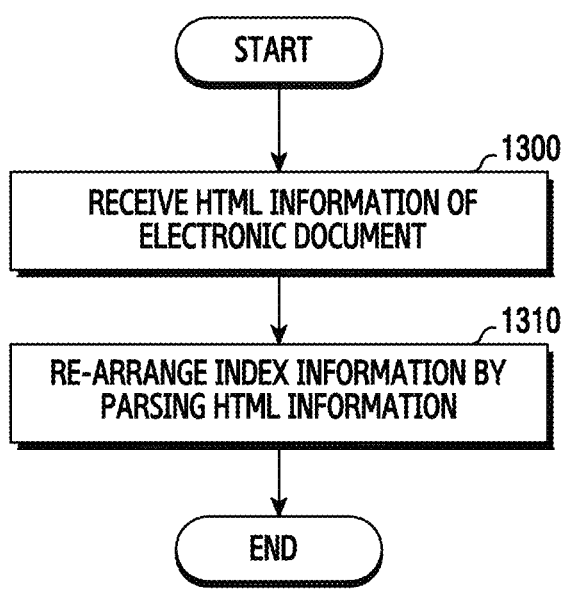
FIG. 13 is a flowchart illustrating an example method of providing an alternative service according to an embodiment of the present disclosure.

FIG. 13 is a flowchart illustrating a method of providing an alternative service according to an embodiment of the present disclosure.

Referring to FIG. 13, the electronic device (for example, the electronic device 100) may receive Hypertext Markup Language (HTML) information of an electronic document in operation 1300. According to an embodiment, the electronic device may execute a web browser and receive HTML information of a webpage through the executed web browser. According to an embodiment, the electronic device may store the received HTML information in a memory.

Figure 14:
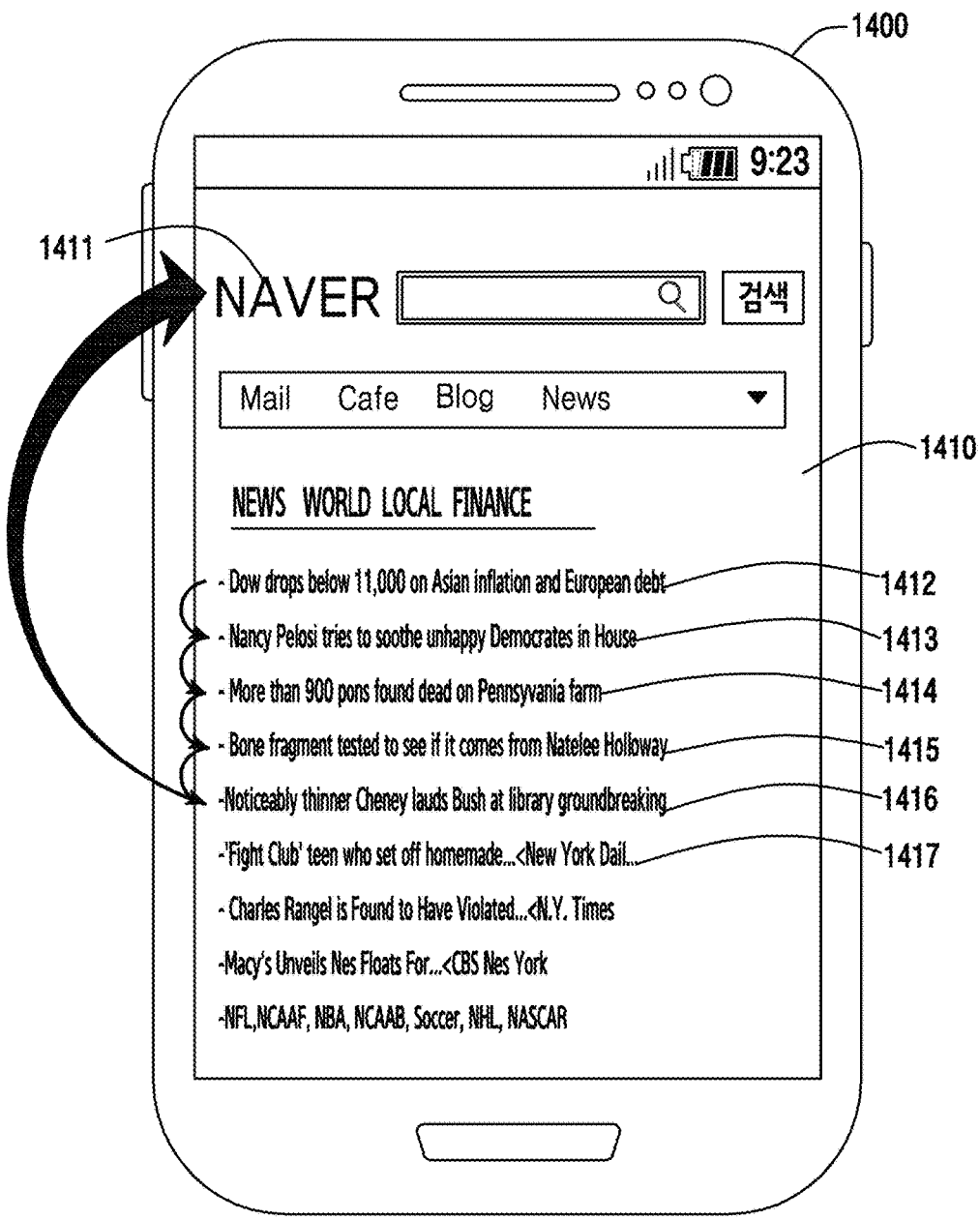
FIG. 14 illustrates an example screen configuration for providing an alternative service according to an embodiment of the present disclosure.

In operation 1310, the electronic device may re-arrange index information by parsing HTML information. According to an embodiment, the electronic device may determine attribute information of the webpage (for example, URL link information, frame information, tag information, image information, hyperlink information, script information, active X control, and java applet) by parsing the received HTML information. For example, in a state where an electronic device 1400 displays a webpage 1410 as illustrated in FIG. 14, the user may move to a particular field (for example, a first field 1411, a second field 1412, a third field 1413, a fourth field 1414, a fifth field 1415, a sixth field 1416, and a seventh field 1417) within a webpage 1410 through a swipe action. According to an embodiment, the user may move to and select a focused (e.g., selected) field, and the electronic device 1400 may indicate to a user the characters corresponding to the focused field through an output voice. According to an embodiment, when a link configuration of the fields of the webpage 1410 (for example, the first field 1411, the second field 1412, the third field 1413, the fourth field 1414, the fifth field 1415, the sixth field 1416, and the seventh field 1417) is the same as a field structure displayed on the screen, the electronic device 1400 may make sequential movement between fields (for example, sequentially move from the second field 1412 to the sixth field 1416 according to the swipe action). However, for example, when the electronic device moves back to the first field 1411 without moving from the sixth field 1416 to the seventh field 1417 as illustrated in FIG. 14, the user cannot move to fields after the sixth field 1416. Accordingly, the electronic device 1400 may re-arrange indexes of the fields displayed in the webpage 1410 with reference to absolute positions of the fields (for example, links, images, text, and the like) displayed on the screen or a display format according to each language thereof. According to an embodiment, the electronic device may re-arrange the indexes through a scheme of deleting all indexes of the corresponding fields to initialize the indexes. For example, the electronic device may smoothly make movement between the fields in the webpage by changing all indexes of the corresponding fields into "0".

Figure 15:
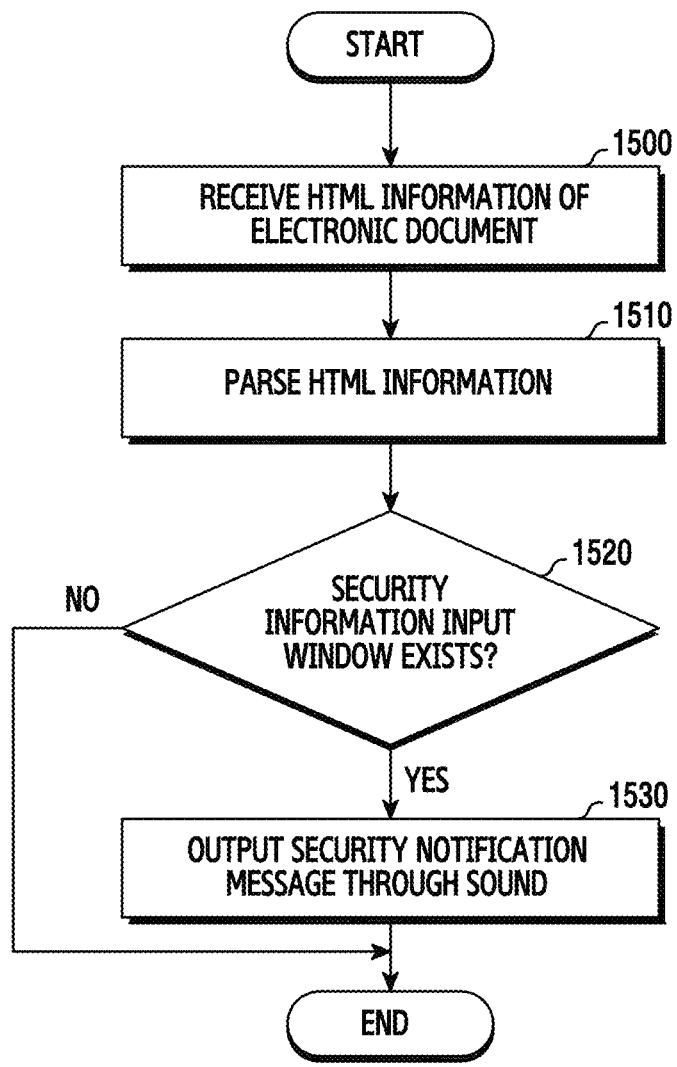
FIG. 15 is a flowchart illustrating an example method of providing an alternative service according to an embodiment of the present disclosure.

FIG. 15 is a flowchart illustrating a method of providing an alternative service according to an embodiment of the present disclosure.

Referring to FIG. 15, the electronic device (for example, the electronic device 100) may receive Hypertext Markup Language (HTML) information of an electronic document in operation 1500. According to an embodiment, the electronic device may execute a web browser and receive HTML information of a webpage through the executed web browser. According to an embodiment, the electronic device may store the received HTML information in a memory.

In operation 1510, the electronic device may parse the HTML information. According to an embodiment, the electronic device may determine attribute information of the webpage (for example, URL link information, frame information, tag information, image information, hyperlink information, script information, active X control, and java applet) by parsing the received HTML information.

In operation 1520, the electronic device may determine whether there is security information input window in the webpage (e.g., a service for entering sensitive information). For example, the electronic device may determine whether the security information input window exists by searching for HTML information stored in the memory. According to an embodiment, the electronic device may identify whether a security information input window exists by using patterns of tags existing in the HTML information or information accumulated in the server. The security information input window may be an input window for receiving user information (for example, a card number, year and date of issue of a card, a password, and the like), but the present disclosure is not limited thereto.

When the security input window exists, the electronic device may output a security notification message through a sound in operation 1530. According to an embodiment, when the security information input window exists, the electronic device may inform of a notification message indicating to mount an ear-set/earphones or a headset/headphones through a voice. According to an embodiment, the electronic device may generate a vibration or output a specific effect sound as an alarm according to an input of secure information. According to an embodiment, when the user inputs security information into the security input window, the electronic device may make a control to not output a voice according to the input security information.

Figure 16:
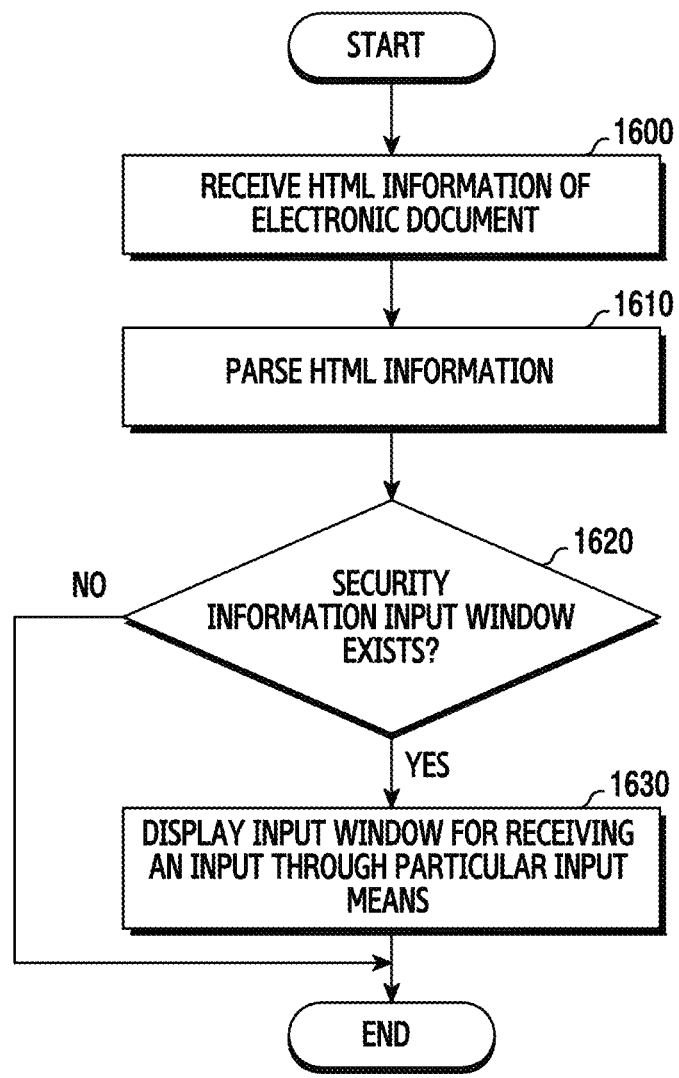
FIG. 16 is a flowchart illustrating an example method of providing an alternative service according to an embodiment of the present disclosure.

FIG. 16 is a flowchart illustrating a method of providing an alternative service according to an embodiment of the present disclosure.

Referring to FIG. 16, the electronic device (for example, the electronic device 100) may receive Hypertext Markup Language (HTML) information of an electronic document in operation 1600. According to an embodiment, the electronic device may execute a web browser and receive HTML information of a webpage through the executed web browser. According to an embodiment, the electronic device may store the received HTML information in a memory.

In operation 1610, the electronic device may parse the HTML information. According to an embodiment, the electronic device may determine attribute information of the webpage (for example, URL link information, frame information, tag information, image information, hyperlink information, script information, active X control, and java applet) by parsing the received HTML information.

In operation 1620, the electronic device may determine whether there is security information input window in the webpage. For example, the electronic device may determine whether the security information input window exists by searching for HTML information stored in the memory. According to an embodiment, the electronic device may identify whether the security information input window exists by using patterns of tags existing in the HTML information or information accumulated in the server. The security information input window may be an input window for receiving user information (for example, a card number, year and date of issue of a card, a password, and the like), but the present disclosure is not limited thereto.

When the security input window exists, the electronic device may display an input window for receiving an input through a particular input means in operation 1630. For example, the electronic device may display an input window for receiving an input through an input pen (for example, a stylus) and the user may input security information into the input window by using the input pen. In another example, the electronic device may display an input window for receiving an input through a particular gesture and receive security information from the user based on the particular gesture.

The operation method of the electronic device according to various embodiments of the present disclosure may include: parsing attribute information of an electronic document; when a component of the electronic document is activated, detecting a format of the activated component based on the parsed attribute information; and when the detected format indicates visual media, outputting an alternative notification comprising at least one a notification in a different format than the detected format.

According to various embodiments, parsing the attribute information of the electronic document comprises parsing tag information of HTML information of the electronic document.

According to various embodiments, parsing the tag information of the HTML information further comprises: classifying components of the electronic document to identify respective formats of each of the components according to the tag information.

According to various embodiments, when the visual media comprises a video service, generating the alternative notification further comprises: deactivating a visual portion of the video service; and generating and outputting alternative audio content of the video service.

According to various embodiments, when the visual media comprises a service for entering sensitive information, generating the alternative notification further comprises outputting a security notification sound indicating the service for entering sensitive information.

According to various embodiments, the method further comprises displaying an input window for entering the sensitive information on a display.

According to various embodiments, when the visual media comprises a captcha service, generating the alternative notification further comprises transmitting the captcha information to a counterpart electronic device.

According to various embodiments, when the visual media comprises an image displayed on the electronic document, generating the alternative notification further comprises extracting text included within the displayed image.

According to various embodiments, generating the alternative notification further comprises: converting the extracted text into audio information and audibly outputting the audio information.

According to various embodiments, the component of the electronic document is activated when an input is detected to the electronic document disposed on the component.

Figure 17:
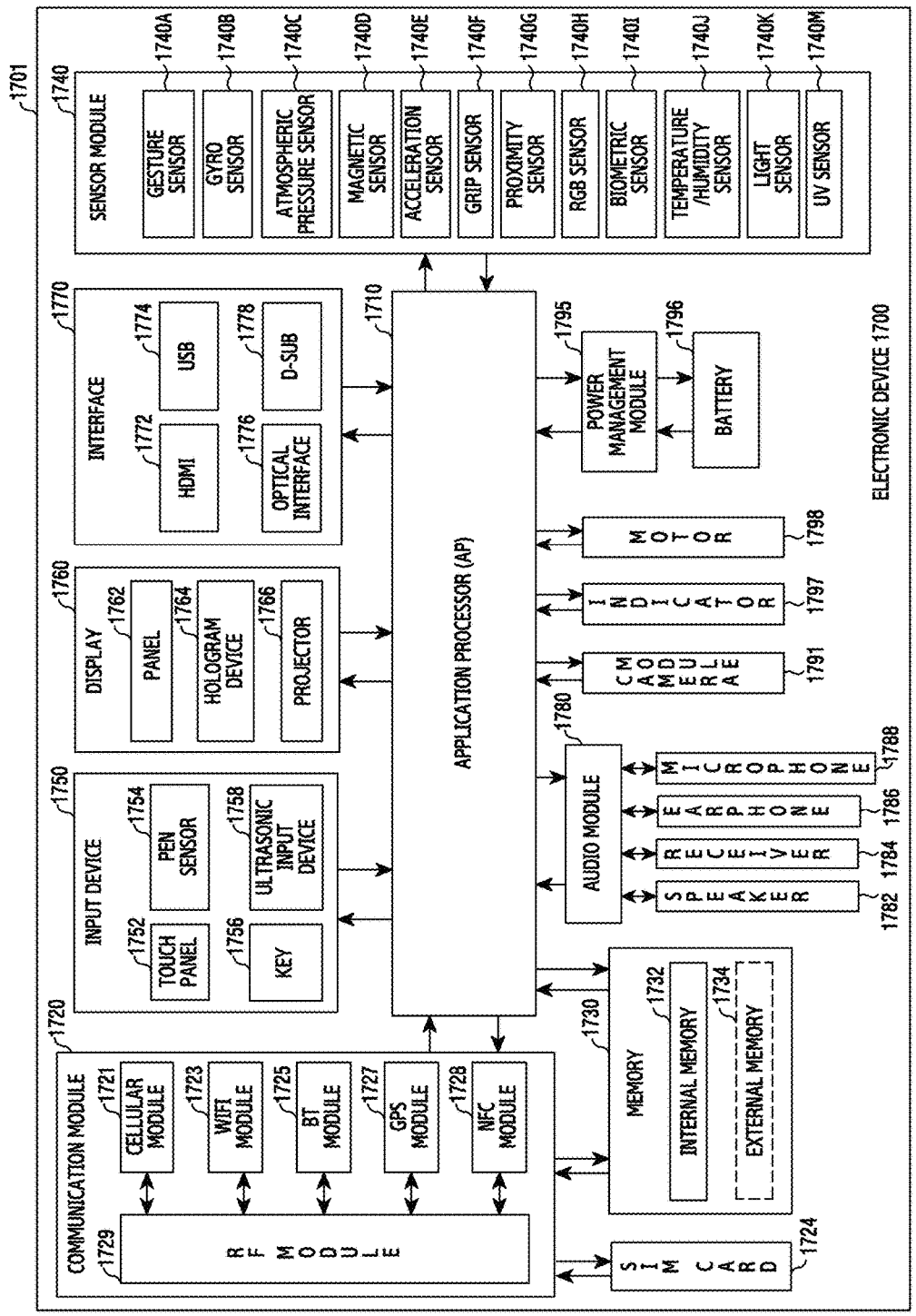
FIG. 17 is a block diagram of an example electronic device according to various embodiments of the present disclosure.

FIG. 17 illustrates a block diagram 1700 of an electronic device 1701 according to various embodiments of the present disclosure. The electronic device 1701 may, for example, constitute all or a part of the electronic device 100 shown in FIG. 1.

Referring to FIG. 17, the electronic device 1701 may include at least one Application Processor (AP) 1710, a communication module 1720, a Subscriber Identification Module (SIM) card 1724, a memory 1730, a sensor module 1740, an input device 1750, a display 1760, an interface 1770, an audio module 1780, a camera module 1791, a power management module 1795, a battery 1796, an indicator 1797, or a motor 1798.

The AP 1710 may control a plurality of hardware or software components connected to the AP 1710 by driving an operating system or an application program and perform processing of various pieces of data including multimedia data and calculations. The AP 1710 may, for example, be implemented by a system on chip (SoC). According to an embodiment, the AP 1710 may further include a Graphic Processing Unit (GPU).

The communication module 1720 may transmit and receive data in communication between the electronic device 1701 (for example, the electronic device 100) and other electronic devices (for example, the electronic device 104 or the server 106) connected thereto through a network. According to an embodiment, the communication module 1720 may include a cellular module 1721, a Wi-Fi module 1723, a BT module 1725, a GPS module 1727, an NFC module 1728, and a Radio Frequency (RF) module 1729.

The cellular module 1721 may provide a voice call, a video call, a text message service, or an Internet service through a communication network (for example, LTE, LTE-A, CDMA, WCDMA, UMTS, WiBro, or GSM). Further, the cellular module 1721 may perform identification and authentication of electronic devices in a communication network using, for example, a subscriber identification module (for example, the SIM card 1724). According to an embodiment, the cellular module 1721 may perform at least some functions which the AP 1710 may provide. For example, the cellular module 1721 may perform at least some of the multimedia control functions.

According to an embodiment, the cellular module 1721 may include a Communication Processor (CP). Furthermore, the cellular module 1721 may be implemented by, for example, an SoC. Although the components such as the cellular module 1721 (for example, a communication processor), the memory 1730, and the power management module 1795 are illustrated as components separate from the AP 1710 in FIG. 17, the AP 1710 may include at least some of the aforementioned components (for example, the cellular module 1721) according to one embodiment.

According to an embodiment, the AP 1710 or the cellular module 1721 (for example, the communication processor) may load a command or data received from at least one of a non-volatile memory and other components connected thereto in a volatile memory, and may process the loaded command or data. Furthermore, the AP 1710 or the cellular module 1721 may store data received from or generated by at least one of other elements in a non-volatile memory.

Each of the Wi-Fi module 1723, the BT module 1725, the GPS module 1727, and the NFC module 1728 may include, for example, a processor for processing data transmitted/received through the corresponding module. Although the cellular module 1721, the Wi-Fi module 1723, the BT module 1725, the GPS module 1727, and the NFC module 1728 are illustrated as separate blocks in FIG. 17, at least some (for example, two or more) of the cellular module 1721, the Wi-Fi module 1723, the BT module 1725, the GPS module 1727, and the NFC module 1728 may be included in one Integrated Chip (IC) or one IC package in one embodiment. For example, at least some (for example, the communication processor corresponding to the cellular module 1721 and the Wi-Fi processor corresponding to the Wi-Fi module 1723) of the processors corresponding to the cellular module 1721, the Wi-Fi module 1723, the BT module 1725, the GPS module 1727, and the NFC module 1728 may be implemented as one SoC.

The RF module 1729 may transmit/receive data, for example, an RF signal. Although not illustrated, the RF module 1729 may include, for example, a transceiver, a Power Amp Module (PAM), a frequency filter, a Low Noise Amplifier (LNA), or the like. Further, the RF module 1729 may further include a component for transmitting/receiving electronic waves over a free air space in wireless communication, for example, a conductor, a conducting wire or the like. Although the cellular module 1721, the Wi-Fi module 1723, the BT module 1725, the GPS module 1727, and the NFC module 1728 share one RF module 729 in FIG. 17, at least one of the cellular module 1721, the Wi-Fi module 1723, the BT module 1725, the GPS module 1727, or the NFC module 1728 may transmit/receive an RF signal through a separate RF module in one embodiment.

The SIM card 1724 may be a card including a subscriber identification module, and may be inserted into a slot formed in a particular portion of the electronic device. The SIM card 1724 may include unique identification information (for example, an Integrated Circuit Card IDentifier (ICCID)) or subscriber information (for example, an International Mobile Subscriber IDentity (IMSI)).

The memory 1730 (for example, the memory 130) may include an internal memory 1732 or an external memory 1734. The internal memory 1732 may include at least one of a volatile memory (for example, a Dynamic Random Access Memory (DRAM), a Static RAM (SRAM), a Synchronous Dynamic RAM (SDRAM), and the like) and a non-volatile memory (for example, a One Time Programmable Read Only Memory (OTPROM), a Programmable ROM (PROM), an Erasable and Programmable ROM (EPROM), an Electrically Erasable and Programmable ROM (EEPROM), a mask ROM, a flash ROM, a NAND flash memory, a NOR flash memory, or the like).

According to an embodiment, the internal memory 1732 may be a Solid State Drive (SSD). The external memory 1734 may further include a flash drive, for example, a Compact Flash (CF), a Secure Digital (SD), a Micro Secure Digital (Micro-SD), a Mini Secure Digital (Mini-SD), an extreme Digital (xD), a memory stick or the like. The external memory 1734 may be functionally connected with the electronic device 1701 through various interfaces. According to an embodiment, the electronic device 1701 may further include a storage device (or a storage medium) such as a hard disc drive.

The sensor module 1740 may measure a physical quantity or detect an operation state of the electronic device 1701, and may convert the measured or detected information to an electrical signal. The sensor module 1740 may include at least one of, for example, a gesture sensor 1740A, a gyro sensor 1740B, an atmospheric pressure sensor 1740C, a magnetic sensor 1740D, an acceleration sensor 1740E, a grip sensor 1740F, a proximity sensor 1740G, a color sensor 1740H (for example, a Red/Green/Blue (RGB) sensor), a biometric sensor 1740I, a temperature/humidity sensor 1740J, an illumination sensor 1740K, or an Ultra Violet (UV) sensor 1740M. Additionally or alternatively, the sensor module 1740 may include, for example, an E-nose sensor (not illustrated), an electromyography (EMG) sensor (not illustrated), an electroencephalogram (EEG) sensor (not illustrated), an electrocardiogram (ECG) sensor (not illustrated), an Infrared (IR) sensor (not illustrated), an iris sensor (not illustrated), and a fingerprint sensor (not illustrated). The sensor module 1740 may further include a control circuit for controlling one or more sensors included in the sensor module.

The input device 1750 may include a touch panel 1752, a (digital) pen sensor 1754, a key 1756, or an ultrasonic input device 1758. The touch panel 1752 may recognize a touch input through at least one of, for example, a capacitive type, a resistive type, an infrared type, or an ultrasonic type. The touch panel 1752 may further include a control circuit. A capacitive touch panel may recognize a physical contact or proximity. The touch panel 1752 may further include a tactile layer. In this case, the touch panel 1752 may provide a tactile reaction to the user.

The (digital) pen sensor 1754 may be implemented, for example, using the same or similar method to receiving a user's touch input or using a separate recognition sheet. The key 1756 may include, for example, a physical button, an optical key, or a keypad. The ultrasonic input device 1758 may identify data by detecting an acoustic wave with a microphone (for example, a microphone 1788) of the electronic device 1701 through an input unit generating an ultrasonic signal, and may perform wireless recognition. According to an embodiment, the electronic device 1701 may receive a user input from an external device (for example, a computer or server) connected thereto using the communication module 1720.

The display 1760 may include a panel 1762, a hologram device 1764 or a projector 1766. The panel 1762 may be, for example, a Liquid Crystal Display (LCD), Active-Matrix Organic Light Emitting Diode (AM-OLED), or the like. The panel 1762 may be implemented to be, for example, flexible, transparent, or wearable. The panel 1762 may be configured as one module together with the touch panel 1752. The hologram device 1764 may show a stereoscopic image in the air by using interference of light. The projector 1766 may project light onto a screen to display an image. The screen may be located, for example, inside or outside the electronic device 1701. According to an embodiment, the display 1760 may further include a control circuit for controlling the panel 1762, the hologram device 1764, or the projector 1766.

The interface 1770 may include, for example, a High-Definition Multimedia Interface (HDMI) 1772, a Universal Serial Bus (USB) 1774, an optical interface 1776, or a D-subminiature (D-sub) 1778. The interface 1770 may be included in, for example, the communication interface 160 illustrated in FIG. 1. Additionally or alternatively, the interface 1770 may include, for example, a Mobile High-definition Link (MHL) interface, a Secure Digital (SD) card/Multi-Media Card (MMC) interface, or an Infrared Data Association (IrDA) standard interface.

The audio module 1780 may bilaterally convert a sound and an electrical signal. The audio module 1780 may process sound information input or output through, for example, a speaker 1782, a receiver 1784, earphones 1786, the microphone 1788 or the like.

The camera module 1791 is a device for capturing a still image or a video, and according to an embodiment, may include one or more image sensors (for example, a front sensor or a rear sensor), a lens (not illustrated), an Image Signal Processor (ISP) (not illustrated), or a flash (not illustrated) (for example, an LED or xenon lamp).

The power management module 1795 may manage power of the electronic device 1701. Although not illustrated, the power management module 1795 may include, for example, a Power Management Integrated Circuit (PMIC), a charger Integrated Circuit (IC), or a battery or fuel gauge. The PMIC may be mounted to, for example, an integrated circuit or an SoC semiconductor.

Charging methods may be classified into a wired charging method and a wireless charging method. The charger IC may charge a battery and prevent over voltage or over current from a charger. According to an embodiment, the charger IC may include a charger IC for at least one of the wired charging method or the wireless charging method. Examples of the wireless charging may include magnetic resonance charging, magnetic induction charging, and electromagnetic charging, and an additional circuit such as a coil loop, a resonance circuit, and a rectifier may be added for the wireless charging.

The battery gauge may measure, for example, a remaining quantity of the battery 1796, or a voltage, a current, or a temperature during the charging. The battery 1796 may store or generate electricity, and may supply power to the electronic device 1701 using the stored or generated electricity. The battery 1796 may include, for example, a rechargeable battery or a solar battery.

The indicator 1797 may display a specific status of the electronic device 1701 or the part (for example, the AP 1710) of electronic device 1701, for example, a booting status, a message status, a charging status, and the like. The motor 1798 may convert an electrical signal to a mechanical vibration. Although not illustrated, the electronic device 1701 may include a processing unit (for example, a GPU) for supporting mobile TV. The processing unit for supporting mobile TV may process media data according to a standard of Digital Multimedia Broadcasting (DMB), Digital Video Broadcasting (DVB), media flow or the like.

The above described components of the electronic device according to various embodiments of the present disclosure may be formed of one or more components, and a name of a corresponding component element may be changed based on the type of electronic device. The electronic device according to the present disclosure may include one or more of the aforementioned components or may further include other additional components, or some of the aforementioned components may be omitted. Further, some of the components of the electronic device according to the various embodiments of the present disclosure may be combined to form a single entity, and thus, may equivalently execute functions of the corresponding elements prior to the combination.

The "module" used in various embodiments of the present disclosure may refer to, for example, a "unit" including one of hardware, software, and firmware, or a combination of two or more of the hardware, software, and firmware. The "module" may be interchangeably used with a term, such as unit, logic, logical block, component, or circuit. The "module" may be the smallest unit of an integrated component or a part thereof. The "module" may be the smallest unit that performs one or more functions or a part thereof. The "module" may be mechanically or electronically implemented. For example, the "module" according to various embodiments of the present disclosure may include at least one of an Application-Specific Integrated Circuit (ASIC) chip, a Field-Programmable Gate Arrays (FPGAs), or a programmable-logic device for performing operations which have been known or are to be developed hereafter.

According to various embodiments, at least some of the devices (for example, modules or functions thereof) or the method (for example, operations) according to the present disclosure may be implemented by a command stored in a computer-readable storage medium in a programming module form. When he command is executed by one or more processors (for example, the processor 120), the one or more processors may execute a function corresponding to the command. The computer-readable storage medium may be, for example, the memory 130. At least a part of the programming module may, for example, be implemented (e.g., executed) by the processor 120. At least some of the programming modules may include, for example, a module, a program, a routine, a set of instructions or a process for performing one or more functions.

The computer readable recoding medium may include magnetic media, such as a hard disk, a floppy disk and a magnetic tape, optical media, such as a Compact Disc Read Only Memory (CD-ROM) and a Digital Versatile Disc (DVD), magneto-optical media, such as a floptical disk, and a hardware device specially configured to store and execute a program instruction (for example, a programming module), such as a Read Only Memory (ROM), a Random Access Memory (RAM), a flash memory, and the like. In addition, the program instructions may include high class language codes, which can be executed in a computer by using an interpreter, as well as machine codes made by a compiler. The aforementioned hardware device may be configured to operate as one or more software modules in order to perform the operation of various embodiments of the present disclosure, and vice versa.

A module or a programming module according to the present disclosure may include at least one of the described component elements, a few of the component elements may be omitted, or additional component elements may be included. Operations executed by a module, a programming module, or other component elements according to various embodiments of the present disclosure may be executed sequentially, in parallel, repeatedly, or in a heuristic manner. Further, some operations may be executed according to another order or may be omitted, or other operations may be added.

According to various embodiments, a storage medium having commands stored therein is provided. When the commands are executed by one or more processors, the processors perform one or more operations. The one or more operations may include: determining attribute information of an electronic document; and providing a service corresponding to the attribute information or setting an alternative service which does not correspond to the attribute information based on the attribute information.

The embodiments of the present disclosure disclosed in the specification and the drawings are particular examples proposed in order to easily describe the technical matters of the present disclosure and help with comprehension of the present disclosure, and do not limit the present disclosure. Therefore, in addition to the embodiments disclosed herein, the various embodiments of the present disclosure should be construed to include all modifications or modified forms drawn based on the technical idea of the various embodiments of the present disclosure.

The above-described embodiments of the present disclosure can be implemented in hardware, firmware or via the execution of software or computer code that can be stored in a recording medium such as a CD ROM, a Digital Versatile Disc (DVD), a magnetic tape, a RAM, a floppy disk, a hard disk, or a magneto-optical disk or computer code downloaded over a network originally stored on a remote recording medium or a non-transitory machine readable medium and to be stored on a local recording medium, so that the methods described herein can be rendered via such software that is stored on the recording medium using a general purpose computer, or a special processor or in programmable or dedicated hardware, such as an ASIC or FPGA. As would be understood in the art, the computer, the processor, microprocessor controller or the programmable hardware include memory components, e.g., RAM, ROM, Flash, etc. that may store or receive software or computer code that when accessed and executed by the computer, processor or hardware implement the processing methods described herein. In addition, it would be recognized that when a general purpose computer accesses code for implementing the processing shown herein, the execution of the code transforms the general purpose computer into a special purpose computer for executing the processing shown herein. Any of the functions and steps provided in the Figures may be implemented in hardware, software or a combination of both and may be performed in whole or in part within the programmed instructions of a computer. No claim element herein is to be construed under the provisions of 35 U.S.C. 112, sixth paragraph, unless the element is expressly recited using the phrase "means for". In addition, an artisan understands and appreciates that a "processor" or "microprocessor" may be hardware in the claimed disclosure. Under the broadest reasonable interpretation, the appended claims are statutory subject matter in compliance with 35 U.S.C. § 101.

What is claimed is:

1. A method in an electronic device, comprising:
    receiving, from a server of a website, data for a hypertext markup language (HTML), in response to accessing to the website;
    detecting information indicating a completely automated Turing test to tell computers and humans apart (CAPTCHA) service by parsing the data received from the server of the website;
    in response to the detection of the CAPTCHA service, determining, based on the detected information for the CAPTCHA service, whether the CAPTCHA service is provided in a form of audio data or the CAPTCHA service is provided in a form of image data;
    in response to the determination that the CAPTCHA service is provided in the form of the audio data, reproducing the audio data via a speaker of the electronic device to authenticate a user of the electronic device;
    in response to the determination that the CAPTCHA service is provided in the form of the image data, transmitting, by the electronic device, the image data to another user operating an external electronic device other than the server of the website for completion of CAPTCHA; and
    after transmitting the image data to the external electronic device, receiving, from the external electronic device CAPTCHA data generated by the another user of the external electronic device, the generated CAPTCHA data for solving the CAPTCHA provided in the form of the image data.

2. The method of claim 1, wherein the CAPTCHA data for solving the CAPTCHA provided in the form of image data, as received by transmission from the external electronic device, includes text data corresponding to characters rendered in the image data, wherein the text data is identified from the another user of the external electronic device.

3. The method of claim 2, wherein the data for the HTML includes at least one of uniform resource locator (URL) link information, tag information, image information, hyperlink information, and script information.

4. The method of claim 3, wherein the data for the HTML comprises a video service, and
    wherein the method further comprises:
    bypassing the determination of whether the CAPTCHA service is provided in a form of audio data or the CAPTCHA service is provided in a form of image data;
    deactivating a visual portion of the video service; and
    retrieving subtitle information or an audio information for the video service by using the URL information which is corresponding to the video service.

5. The method of claim 1, wherein the external electronic device is identified using a phone number which is stored locally in the electronic device.

6. The method of claim 3, wherein the detecting of the information indicating the CAPTCHA service is based on a pattern of the tag information included in the data for HTML.

7. The method of claim 1, wherein the data for the HTML comprises information related to a log-in field, and
    wherein the method further comprises:
    bypassing the determination of whether the CAPTCHA service is provided in a form of audio data or the CAPTCHA service is provided in a form of image data; and
    displaying the log-in field on a center of a display of the electronic device, in response to detecting a non-selection-based user input corresponding to the log-in field.

8. The method of claim 1, wherein the data for the HTML comprises an input window for receiving a personal information, and
    wherein the method further comprises:
    bypassing the determination of whether the CAPTCHA service is provided in a form of audio data or the CAPTCHA service is provided in a form of image data; and
    outputting a notification for indicating that a user of the electronic device is required to connect an earphone or a headset.

9. The method of claim 1, wherein the audio data is reproduced by using text to speak (TTS) algorithm.

10. The method of claim 6, wherein the electronic device is authenticated by transmitting the CAPTCHA data corresponding to the characters rendered in the image data, to the server of the website.

11. An electronic device, comprising:
a display unit; and
a processor configured to:
receive, from a server of a website, data for a hypertext markup language (HTML), in response to accessing to the website,
detect information indicating a completely automated Turing test to tell computers and humans apart (CAPTCHA) service by parsing the data received from the server of the web site,
in response to the detection of the CAPTCHA service, determine, based on the detected information for the CAPTCHA service, whether the CAPTCHA service is provided in a form of audio data or the CAPTCHA service is provided in a form of image data,
in response to the determination that the CAPTCHA service is provided in the form of the audio data, reproduce the audio data via a speaker of the electronic device to authenticate a user of the electronic device,
in response to the determination that the CAPTCHA service is provided in the form of the image data, transmit, by the electronic device, the image data to another user operating an external electronic device other than the server of the website for completion of the CAPTCHA, and
after transmitting the image data to the external electronic device, receive, from the external electronic device, data generated by the another user of the external electronic device, the generated data for solving the CAPTCHA provided in the form of the image data.

12. The electronic device of claim 11, wherein the data for solving the CAPTCHA provided in the form of image data, as received by transmission from the external electronic device, includes text data corresponding to characters rendered in the image data, wherein the text data is identified from the another user of the external electronic device.

13. The electronic device of claim 12, wherein the data for the HTML includes at least one of uniform resource locator (URL) link information, tag information, image information, hyperlink information, and script information.

14. The electronic device of claim 13, wherein the data for the HTML comprises a video service, and
wherein the processor is further configured to:
deactivate a visual portion of the video service; and
retrieve subtitle information or an audio information for the video service by using the URL information which is corresponding to the video service.

15. The electronic device of claim 11, wherein the external electronic device is identified using a phone number which is stored locally in the electronic device.

16. The electronic device of claim 11, wherein the detecting of the information indicating the CAPTCHA service is based on a pattern of tag information included in the data for HTML.

17. The electronic device of claim 11, wherein the data for the HTML comprises a log-in field, and
wherein the processor is further configured to:
bypass the determination of whether the CAPTCHA service is provided in a form of audio data or the CAPTCHA service is provided in a form of image data,
display the log-in field on a center of the display unit of the electronic device, in response to detecting a non-selection-based user input corresponding to the log-in field.

18. The electronic device of claim 11, wherein the data for the HTML comprises an input window for receiving a personal information, and
wherein the processor is further configured to:
output a notification for indicating that a user of the electronic device is required to connect an earphone or a headset.

19. The electronic device of claim 11, wherein the audio data is reproduced by using text to speak (TTS) algorithm.

20. The electronic device of claim 16, wherein the electronic device is authenticated by transmitting the data of the another user corresponding to characters rendered in the image data, to the server of the website.

* * * * *